(12) United States Patent
Higgins-Luthman

(10) Patent No.: US 9,940,528 B2
(45) Date of Patent: Apr. 10, 2018

(54) DRIVER ASSISTANCE SYSTEM FOR VEHICLE

(71) Applicant: MAGNA ELECTRONICS INC., Auburn Hills, MI (US)

(72) Inventor: Michael J. Higgins-Luthman, Livonia, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 76 days.

(21) Appl. No.: 14/946,855

(22) Filed: Nov. 20, 2015

(65) Prior Publication Data

US 2016/0078305 A1 Mar. 17, 2016

Related U.S. Application Data

(63) Continuation of application No. 14/690,745, filed on Apr. 20, 2015, now Pat. No. 9,193,303, which is a
(Continued)

(51) Int. Cl.
*G06K 9/00* (2006.01)
*H04N 7/18* (2006.01)
(Continued)

(52) U.S. Cl.
CPC ......... *G06K 9/00798* (2013.01); *B60Q 9/008* (2013.01); *B60R 1/00* (2013.01);
(Continued)

(58) Field of Classification Search
CPC .......... G06K 9/00798; G06K 9/00825; G06K 9/00805; H04N 7/181; H04N 5/374;
(Continued)

(56) References Cited

U.S. PATENT DOCUMENTS 2,632,040 A 3/1953 Rabinow
2,827,594 A 3/1953 Rabinow
(Continued)

FOREIGN PATENT DOCUMENTS

DE 2133182 1/1973
DE 2808260 8/1979
(Continued)

OTHER PUBLICATIONS

Ahmed et al., "Differential Methods for Nonmetric Calibration of Camera Lens Distortion," Computer Vision and Pattern Recognition, 2001. CVPR 2001. Proceedings of the 2001 IEEE Computer Society Conference on. vol. 2. IEEE, 2001.
(Continued)

*Primary Examiner* — Jaime Figueroa
(74) *Attorney, Agent, or Firm* — Honigman Miller Schwartz and Cohn, LLP

(57) ABSTRACT

A driver assistance system for a vehicle includes first and second cameras and a rear backup camera. A control processes image data captured by the first camera and determines that the first camera is misaligned when the first camera is disposed at the left side of the vehicle. The control, responsive to a determination of misalignment of the first camera, is operable to algorithmically at least partially compensate for misalignment of the first camera. At least in part responsive to processing of captured image data, a composite image is displayed that provides a view that approximates a view from a single virtual camera. Image data captured at least by the first camera is processed using an edge detection algorithm to detect edges of objects exterior of the vehicle. Responsive at least in part to processing of captured image data, an object of interest exterior of the vehicle is determined.

34 Claims, 11 Drawing Sheets

Related U.S. Application Data continuation of application No. 14/033,962, filed on Sep. 23, 2013, now Pat. No. 9,014,904, which is a continuation of application No. 13/776,100, filed on Feb. 25, 2013, now Pat. No. 8,543,277, which is a continuation of application No. 13/566,266, filed on Aug. 3, 2012, now Pat. No. 8,386,114, which is a continuation of application No. 13/370,694, filed on Feb. 10, 2012, now Pat. No. 8,239,086, which is a continuation of application No. 13/190,931, filed on Jul. 26, 2011, now Pat. No. 8,116,929, which is a continuation of application No. 12/979,497, filed on Dec. 28, 2010, now Pat. No. 7,991,522, which is a continuation of application No. 12/764,355, filed on Apr. 21, 2010, now Pat. No. 7,877,175, which is a continuation of application No. 11/315,675, filed on Dec. 22, 2005, now Pat. No. 7,720,580.

(60) Provisional application No. 60/638,687, filed on Dec. 23, 2004.

(51) Int. Cl.
   *B60R 1/12* (2006.01)
   *B60Q 9/00* (2006.01)
   *H04N 5/374* (2011.01)
   *H04N 5/232* (2006.01)
   *B60R 1/00* (2006.01)
   *B60W 40/04* (2006.01)
   *B60W 50/14* (2012.01)

(52) U.S. Cl.
   CPC ............ *B60R 1/12* (2013.01); *B60W 40/04* (2013.01); *G06K 9/00805* (2013.01); *G06K 9/00825* (2013.01); *H04N 5/23229* (2013.01); *H04N 5/374* (2013.01); *H04N 7/18* (2013.01); *H04N 7/181* (2013.01); *B60R 2001/1253* (2013.01); *B60R 2300/105* (2013.01); *B60R 2300/30* (2013.01); *B60R 2300/402* (2013.01); *B60R 2300/802* (2013.01); *B60R 2300/804* (2013.01); *B60R 2300/806* (2013.01); *B60R 2300/8066* (2013.01); *B60W 50/14* (2013.01)

(58) Field of Classification Search
   CPC ........ H04N 5/23229; H04N 7/18; B60R 1/12; B60R 1/00; B60R 2300/105; B60R 2001/1253; B60R 2300/30; B60R 2300/806; B60R 2300/804; B60R 2300/802; B60R 2300/402; B60R 2300/8066; B60Q 9/008; B60W 40/04; B60W 50/14
   USPC .......... 701/28, 36, 301; 250/208.1; 340/435, 340/436; 382/104, 199
   See application file for complete search history.

(56) References Cited

U.S. PATENT DOCUMENTS

| | | |
|---|---|---|
| 3,985,424 A | 10/1976 | Steinacher |
| 4,037,134 A | 7/1977 | Loper |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,254,931 A | 3/1981 | Aikens |
| 4,258,979 A | 3/1981 | Mahin |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer |
| 4,532,550 A | 7/1985 | Bendell et al. |
| 4,546,551 A | 10/1985 | Franks |
| 4,549,208 A | 10/1985 | Kam Ejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,645,975 A | 2/1987 | Meitzler et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,758,883 A | 7/1988 | Kawahara et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,859,031 A | 8/1989 | Berman et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,900,133 A | 2/1990 | Berman |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,931,937 A | 6/1990 | Kakinami et al. |
| 4,937,796 A | 6/1990 | Tendler |
| 4,942,533 A | 7/1990 | Kakinami et al. |

(56) References Cited

U.S. PATENT DOCUMENTS

| | | |
|---|---|---|
| 4,953,305 A | 9/1990 | Van Lente et al. |
| 4,956,591 A | 9/1990 | Schierbeek |
| 4,961,625 A | 10/1990 | Wood et al. |
| 4,966,441 A | 10/1990 | Conner |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,128,874 A | 7/1992 | Bhanu et al. |
| 5,130,709 A | 7/1992 | Toyama et al. |
| 5,148,014 A | 9/1992 | Lynam |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,304,980 A | 4/1994 | Maekawa |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,351,044 A | 9/1994 | Mathur et al. |
| 5,355,118 A | 10/1994 | Fukuhara |
| 5,359,666 A | 10/1994 | Nakayama et al. |
| 5,365,603 A | 11/1994 | Karmann |
| 5,369,590 A | 11/1994 | Karasudani |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,448,484 A | 9/1995 | Bullock et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,559,695 A | 9/1996 | Daily |
| 5,568,027 A | 10/1996 | Teder |
| 5,574,443 A | 11/1996 | Hsieh |
| 5,581,464 A | 12/1996 | Wolf et al. |
| 5,594,222 A | 1/1997 | Caldwell |
| 5,614,788 A | 3/1997 | Mullins |
| 5,617,085 A | 4/1997 | Tsutsumi et al. |
| 5,619,370 A | 4/1997 | Guinosso |
| 5,634,709 A | 6/1997 | Iwama |
| 5,638,116 A | 6/1997 | Shimoura et al. |
| 5,642,093 A | 6/1997 | Kinoshita et al. |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A * | 9/1997 | Schofield ............... B60N 2/002<br>340/435 |
| 5,675,489 A | 10/1997 | Pomerleau |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,745,310 A | 4/1998 | Mathieu |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |

(56) References Cited

U.S. PATENT DOCUMENTS

| | | |
|---|---|---|
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,890,083 A | 3/1999 | Franke et al. |
| 5,892,855 A | 4/1999 | Kakinami et al. |
| 5,896,085 A | 4/1999 | Mori et al. |
| 5,899,956 A | 5/1999 | Chan |
| 5,904,725 A | 5/1999 | Iisaka et al. |
| 5,914,815 A | 6/1999 | Bos |
| 5,920,367 A | 7/1999 | Kajimoto et al. |
| 5,923,027 A | 7/1999 | Stam et al. |
| 5,929,784 A | 7/1999 | Kawaziri et al. |
| 5,929,786 A | 7/1999 | Schofield et al. |
| 5,940,120 A | 8/1999 | Frankhouse et al. |
| 5,949,331 A * | 9/1999 | Schofield .............. B60N 2/002 340/435 |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,005,492 A | 12/1999 | Tamura et al. |
| 6,009,336 A | 12/1999 | Harris et al. |
| 6,009,337 A | 12/1999 | Väisänen et al. |
| 6,020,704 A | 2/2000 | Buschur |
| 6,044,321 A | 3/2000 | Nakamura et al. |
| 6,049,171 A | 4/2000 | Stam et al. |
| 6,049,619 A | 4/2000 | Anandan et al. |
| 6,052,124 A | 4/2000 | Stein et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,097,023 A | 8/2000 | Schofield et al. |
| 6,097,024 A | 8/2000 | Stam et al. |
| 6,100,811 A | 8/2000 | Hsu et al. |
| 6,104,552 A | 8/2000 | Thau et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,169,940 B1 | 1/2001 | Jitsukata et al. |
| 6,172,613 B1 | 1/2001 | DeLine et al. |
| 6,173,222 B1 | 1/2001 | Seo et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,236 B1 | 3/2001 | Juds |
| 6,201,642 B1 | 3/2001 | Bos |
| 6,218,960 B1 | 4/2001 | Ishikawa et al. |
| 6,222,447 B1 * | 4/2001 | Schofield .............. B60N 2/002 340/435 |
| 6,222,460 B1 | 4/2001 | DeLine et al. |
| 6,226,061 B1 | 5/2001 | Tagusa |
| 6,226,389 B1 | 5/2001 | Lemelson et al. |
| 6,226,592 B1 | 5/2001 | Luckscheiter et al. |
| 6,243,003 B1 | 6/2001 | DeLine et al. |
| 6,246,961 B1 | 6/2001 | Sasaki et al. |
| 6,249,214 B1 | 6/2001 | Kashiwazaki |
| 6,250,148 B1 | 6/2001 | Lynam |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,269,308 B1 | 7/2001 | Kodaka et al. |
| 6,278,377 B1 | 8/2001 | DeLine et al. |
| 6,282,483 B1 | 8/2001 | Yano et al. |
| 6,285,393 B1 | 9/2001 | Shimoura et al. |
| 6,285,778 B1 | 9/2001 | Nakajima et al. |
| 6,291,906 B1 | 9/2001 | Marcus et al. |
| 6,292,111 B1 | 9/2001 | Ishikawa et al. |
| 6,292,752 B1 | 9/2001 | Franke et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,330,511 B2 | 12/2001 | Ogura et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B1 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | Deline et al. |
| 6,424,273 B1 * | 7/2002 | Gutta ...................... B60R 1/00 340/435 |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,445,287 B1 | 9/2002 | Schofield et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,515,378 B2 | 2/2003 | Drummond et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,542,840 B2 | 4/2003 | Okamoto et al. |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,570,998 B1 * | 5/2003 | Ohtsuka .............. B60R 16/0231 340/907 |
| 6,574,033 B1 | 6/2003 | Chui et al. |
| 6,578,017 B1 | 6/2003 | Ebersole et al. |
| 6,580,996 B1 | 6/2003 | Friedrich |
| 6,587,573 B1 | 7/2003 | Stam et al. |
| 6,589,625 B1 | 7/2003 | Kothari et al. |
| 6,590,719 B2 | 7/2003 | Bos |
| 6,593,011 B2 | 7/2003 | Liu et al. |
| 6,593,565 B2 | 7/2003 | Heslin et al. |
| 6,593,698 B2 * | 7/2003 | Stam ...................... B60Q 1/085 250/208.1 |
| 6,594,583 B2 | 7/2003 | Ogura et al. |
| 6,611,202 B2 * | 8/2003 | Schofield .............. B60N 2/002 340/461 |
| 6,611,610 B1 | 8/2003 | Stam et al. |
| 6,627,918 B2 | 9/2003 | Getz et al. |
| 6,631,316 B2 | 10/2003 | Stam et al. |

(56) References Cited

U.S. PATENT DOCUMENTS

| | | |
|---|---|---|
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,671,607 B2 | 12/2003 | Ishizu et al. |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,691,008 B2 | 2/2004 | Kondo et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,708,100 B2 | 3/2004 | Russell et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,748,312 B2 | 6/2004 | Russell et al. |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,807,287 B1 | 10/2004 | Hermans |
| 6,813,371 B2 | 11/2004 | Kakinami |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,864,930 B2 | 3/2005 | Matsushita et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,917,693 B1 * | 7/2005 | Kiridena ............... B60R 1/00 348/E7.086 |
| 6,941,216 B2 | 9/2005 | Isogai et al. |
| 6,946,978 B2 | 9/2005 | Schofield |
| 6,953,253 B2 | 10/2005 | Schofield et al. |
| 6,968,266 B2 | 11/2005 | Ahmed-Zaid et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,049,945 B2 | 5/2006 | Breed et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,844 B2 | 12/2006 | Stevenson et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,295,682 B2 | 11/2007 | Otsuka et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,463,138 B2 | 12/2008 | Pawlicki et al. |
| 7,502,048 B2 * | 3/2009 | Okamoto ............... B60R 1/00 348/148 |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,566,851 B2 | 7/2009 | Stein et al. |
| 7,605,856 B2 * | 10/2009 | Imoto ............... B60R 1/00 348/335 |
| 7,616,781 B2 * | 11/2009 | Schofield ............ G06K 9/00818 382/104 |
| 7,619,508 B2 * | 11/2009 | Lynam ............... B60K 35/00 340/425.5 |
| 7,633,383 B2 | 12/2009 | Dunsmoir et al. |
| 7,639,149 B2 | 12/2009 | Katoh |
| 7,655,894 B2 | 2/2010 | Schofield et al. |
| 7,676,087 B2 | 3/2010 | Dhua et al. |
| 7,720,580 B2 | 5/2010 | Higgins-Luthman |
| 7,729,580 B2 | 6/2010 | Tanaka et al. |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 * | 12/2010 | Schofield ............ B60N 2/002 348/148 |
| 7,877,175 B2 | 1/2011 | Higgins-Luthman |
| 7,881,496 B2 | 2/2011 | Camilleri |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,486 B2 | 5/2011 | Denny et al. |
| 7,991,522 B2 | 8/2011 | Higgins-Luthman |
| 7,994,462 B2 | 8/2011 | Schofield et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,095,310 B2 | 1/2012 | Taylor et al. |
| 8,098,142 B2 | 1/2012 | Schofield et al. |
| 8,100,568 B2 | 1/2012 | DeLine et al. |
| 8,164,628 B2 | 4/2012 | Stein et al. |
| 8,203,440 B2 | 6/2012 | Schofield et al. |
| 8,222,588 B2 | 7/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,314,689 B2 | 11/2012 | Schofield et al. |
| 8,324,552 B2 | 12/2012 | Schofield et al. |
| 8,378,851 B2 | 2/2013 | Stein et al. |
| 8,386,114 B2 | 2/2013 | Higgins-Luthman |
| 8,421,865 B2 | 4/2013 | Euler et al. |
| 8,452,055 B2 | 5/2013 | Stein et al. |
| 8,534,887 B2 | 9/2013 | DeLine et al. |
| 8,553,088 B2 | 10/2013 | Stein et al. |
| 9,014,904 B2 | 4/2015 | Higgins-Luthman |
| 9,193,303 B2 | 11/2015 | Higgins-Luthman |
| 2002/0005778 A1 | 1/2002 | Breed |
| 2002/0011611 A1 | 1/2002 | Huang et al. |
| 2002/0080235 A1 | 6/2002 | Jeon |

(56) References Cited

U.S. PATENT DOCUMENTS

| | | | |
|---|---|---|---|
| 2002/0113873 A1 | 8/2002 | Williams | |
| 2002/0167589 A1 | 11/2002 | Schofield et al. | |
| 2003/0052773 A1 | 3/2003 | Sjonell | |
| 2003/0103142 A1* | 6/2003 | Hitomi | B60R 1/074 348/148 |
| 2003/0137586 A1 | 7/2003 | Lewellen | |
| 2003/0156015 A1 | 8/2003 | Winner et al. | |
| 2003/0169522 A1 | 9/2003 | Schofield et al. | |
| 2003/0222982 A1 | 12/2003 | Hamdan et al. | |
| 2004/0016870 A1* | 1/2004 | Pawlicki | G06T 7/13 250/208.1 |
| 2004/0164228 A1* | 8/2004 | Fogg | B60Q 1/1423 250/208.1 |
| 2005/0083427 A1* | 4/2005 | Imoto | B60R 1/00 348/335 |
| 2005/0219852 A1 | 10/2005 | Stam et al. | |
| 2005/0237385 A1 | 10/2005 | Kosaka et al. | |
| 2006/0018511 A1 | 1/2006 | Stam et al. | |
| 2006/0018512 A1 | 1/2006 | Stam et al. | |
| 2006/0050018 A1 | 3/2006 | Hutzel et al. | |
| 2006/0091813 A1 | 5/2006 | Stam et al. | |
| 2006/0103727 A1 | 5/2006 | Tseng | |
| 2006/0250501 A1 | 11/2006 | Wildmann et al. | |
| 2007/0024724 A1 | 2/2007 | Stein et al. | |
| 2007/0104476 A1 | 5/2007 | Yasutomi et al. | |
| 2007/0109406 A1 | 5/2007 | Schofield et al. | |
| 2007/0120657 A1 | 5/2007 | Schofield et al. | |
| 2007/0242339 A1 | 10/2007 | Bradley | |
| 2008/0043099 A1 | 2/2008 | Stein et al. | |
| 2008/0147321 A1 | 6/2008 | Howard et al. | |
| 2008/0192132 A1 | 8/2008 | Bechtel et al. | |
| 2008/0266396 A1 | 10/2008 | Stein | |
| 2009/0113509 A1 | 4/2009 | Tseng et al. | |
| 2009/0160987 A1 | 6/2009 | Bechtel et al. | |
| 2009/0190015 A1 | 7/2009 | Bechtel et al. | |
| 2009/0256938 A1 | 10/2009 | Bechtel et al. | |
| 2009/0290032 A1 | 11/2009 | Zhang et al. | |
| 2011/0216201 A1 | 9/2011 | McAndrew et al. | |
| 2012/0045112 A1 | 2/2012 | Lundblad et al. | |
| 2012/0069185 A1 | 3/2012 | Stein | |
| 2012/0176528 A1 | 7/2012 | Denny et al. | |
| 2012/0200707 A1 | 8/2012 | Stein et al. | |
| 2012/0314071 A1 | 12/2012 | Rosenbaum et al. | |
| 2012/0320209 A1 | 12/2012 | Vico | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0286193 A1 | 10/2013 | Pflug | |
| 2013/0321615 A1* | 12/2013 | Schofield | B60Q 1/346 348/118 |
| 2014/0022378 A1 | 1/2014 | Higgins-Luthman | |
| 2014/0043473 A1 | 2/2014 | Rathi et al. | |
| 2014/0063254 A1 | 3/2014 | Shi et al. | |
| 2014/0098229 A1 | 4/2014 | Lu et al. | |
| 2014/0247352 A1 | 9/2014 | Rathi et al. | |
| 2014/0247354 A1 | 9/2014 | Knudsen | |
| 2014/0320658 A1 | 10/2014 | Pliefke | |
| 2014/0333729 A1 | 11/2014 | Pflug | |
| 2014/0347486 A1 | 11/2014 | Okouneva | |
| 2014/0350834 A1 | 11/2014 | Turk | |
| 2015/0217694 A1* | 8/2015 | Bingle | B60R 11/04 348/373 |

FOREIGN PATENT DOCUMENTS

| | | |
|---|---|---|
| DE | 2931368 | 2/1981 |
| DE | 2946561 | 5/1981 |
| DE | 3041692 | 5/1981 |
| DE | 3248511 | 7/1984 |
| DE | 3041612 | 8/1986 |
| DE | 4107965 | 9/1991 |
| DE | 4118208 | 11/1991 |
| DE | 4139515 | 6/1992 |
| DE | 4123641 | 1/1993 |
| DE | 4124654 | 1/1993 |
| DE | 10115043 | 3/2001 |
| EP | 0048810 | 4/1982 |
| EP | 0202460 | 11/1986 |
| EP | 0830267 | 3/1988 |
| EP | 0353200 | 1/1990 |
| EP | 0354261 | 2/1990 |
| EP | 0416222 | 6/1990 |
| EP | 0527665 | 2/1991 |
| EP | 0426503 | 5/1991 |
| EP | 0450553 | 10/1991 |
| EP | 0492591 | 7/1992 |
| EP | 0513476 | 11/1992 |
| EP | 0361914 | 2/1993 |
| EP | 0591743 | 4/1994 |
| EP | 0605045 | 7/1994 |
| EP | 0640903 | 3/1995 |
| EP | 0697641 | 2/1996 |
| EP | 0755524 | 1/1997 |
| EP | 0788947 | 8/1997 |
| EP | 1074430 | 2/2001 |
| EP | 1115250 | 7/2001 |
| EP | 1120746 | 8/2001 |
| EP | 1339228 | 8/2003 |
| EP | 2377094 | 10/2011 |
| EP | 2667325 | 11/2013 |
| FR | 2241085 | 3/1975 |
| FR | 2513198 | 3/1983 |
| FR | 2585991 | 2/1987 |
| FR | 2641237 | 6/1990 |
| FR | 2672857 | 8/1992 |
| FR | 2673499 | 9/1992 |
| FR | 2726144 | 4/1996 |
| GB | 934037 | 8/1963 |
| GB | 1535182 | 12/1978 |
| GB | 2029343 | 3/1980 |
| GB | 2119087 | 11/1983 |
| GB | 2137373 | 10/1984 |
| GB | 2137573 | 10/1984 |
| GB | 2156295 | 10/1985 |
| GB | 2233530 | 9/1991 |
| GB | 2244187 | 11/1991 |
| GB | 2255539 | 11/1992 |
| GB | 2327823 | 2/1999 |
| JP | S5539843 | 3/1980 |
| JP | 57173801 | 10/1982 |
| JP | 57208530 | 12/1982 |
| JP | 57208531 | 12/1982 |
| JP | S58110334 | 6/1983 |
| JP | 58209635 | 12/1983 |
| JP | 59114139 | 7/1984 |
| JP | 59133336 | 7/1984 |
| JP | 6079889 | 5/1985 |
| JP | 6080953 | 5/1985 |
| JP | 60212730 | 10/1985 |
| JP | 60261275 | 12/1985 |
| JP | 6243543 | 2/1987 |
| JP | 6216073 | 4/1987 |
| JP | S6216073 | 4/1987 |
| JP | 6272245 | 5/1987 |
| JP | 62122487 | 6/1987 |
| JP | 62122844 | 6/1987 |
| JP | S62131837 | 6/1987 |
| JP | 6414700 | 1/1989 |
| JP | 02117935 | 3/1989 |
| JP | 01123587 | 5/1989 |
| JP | H1168538 | 7/1989 |
| JP | H236417 | 8/1990 |
| JP | 371399 | 3/1991 |
| JP | 3099952 | 4/1991 |
| JP | 03099952 | 4/1991 |
| JP | 04239400 | 11/1991 |
| JP | 03284413 | 12/1991 |
| JP | H0424132 | 1/1992 |
| JP | 04114587 | 4/1992 |
| JP | H04127280 | 4/1992 |
| JP | 04245886 | 9/1992 |
| JP | 0577657 | 3/1993 |
| JP | 05050883 | 3/1993 |

(56) References Cited

FOREIGN PATENT DOCUMENTS

| | | |
|---|---|---|
| JP | 55000883 | 3/1993 |
| JP | 05213113 | 8/1993 |
| JP | 5213113 | 8/1993 |
| JP | H05189694 | 9/1993 |
| JP | 06107035 | 4/1994 |
| JP | 06156638 | 6/1994 |
| JP | 6227318 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 730149 | 6/1995 |
| JP | 08166221 | 6/1996 |
| JP | 2630604 | 7/1997 |
| JP | 200274339 | 3/2002 |
| JP | 2002232869 | 8/2002 |
| JP | 200350107 | 2/2003 |
| JP | 200376987 | 3/2003 |
| JP | 2003083742 | 3/2003 |
| JP | 2003329411 | 11/2003 |
| JP | 20041658 | 1/2004 |
| JP | 2004001658 A * | 1/2004 |
| WO | WO1994019212 | 2/1994 |
| WO | WO1994/27262 | 11/1994 |
| WO | WO1996021581 | 7/1996 |
| WO | WO 9638319 A2 * | 12/1996 ............ B60N 2/002 |
| WO | WO1996038319 | 12/1996 |
| WO | WO1998/14974 | 4/1998 |
| WO | WO1999/14088 | 3/1999 |
| WO | WO1999/23828 | 5/1999 |
| WO | WO2012139636 | 10/2012 |
| WO | WO2012139660 | 10/2012 |
| WO | WO2012143036 | 10/2012 |

OTHER PUBLICATIONS

Aufrere et al., "A fast and robust vision based road following algorithm," Proceedings of the IEEE Intelligent Vehicles Symposium 2000, Dearborn, MI, Oct. 3-5, 2000.
Ballard et al., "Computer Vision", 1982, p. 88-89, sect. 3.4.1.
Batavia et al., "Detecting Overtaking Vehicles with Implicit Optical Flow," Robotics Institute, Carnegie Mellon University, Mar. 4, 1998.
Behringer et al., "Visuelle Erkennung and Interpretation des Fahrspurver-Laufes durch Rechnersehen fur ein autonomes Strassenfahrzeug", No. 310.
Bertozzi et al., "Obstacle and Lane Detection on the ARGO Autonomous Vehicle," University of Parma, Italy.
Bertozzi et al., "Pedestrian Localization and Tracking System with Kalman Filtering," IEEE Intelligent Vehicles Symposium, University of Parma, Italy, Jun. 14-17, 2004.
Bertozzi et al., "Vision-based intelligent vehicles: State of the art and perspectives," Robotics and Autonomous Systems, 2000.
Birkland, "See and Be Seen", Management Techniques, Fleet Equipment, May 1993.
Bishop, "Intelligent Vehicle Applications Worldwide," Intelligent Transportation Systems, Jan.-Feb. 2000.
Bogner, "An Introduction to Panosheric Imaging," IEEE, 1995.
Bohrer et al., "An Integrated Obstacle Detection Framework for Intelligent Cruise Control on Motorways," Research Gate Conference Paper, Oct. 1995.
Braess et al., "Prometheus: Vision des Intelligenten Automobils' auf 'intelligenter Strasse'?" Forschung, Versuch einer kristischen Wurdigung—Teil 1, pp. 200-205.
Braess et al., "Prometheus: Vision des lintelligenten Automobils' auf 'intelligenter Strasse'?" Forschung, Versuch einer kristischen Wurdigung—Teil 2, pp. 330-336.

Brauckmann et al., "Towards All Around Automatic Visual Obstacle Sensing for Cars," Germany, no date.
Broggi et al., "Self-Calibration of a Stereo Vision System for Automotive Applications", Proceedings of the 2001 IEEE International Conference on Robotics & Automation, Seoul, KR, May 21-26, 2001.
Broggi et al., "Shape-based Pedestrian Detection," Proceedings of the IEEE Intelligent Vehicles Symposium, 2000.
Broggi et al., "The Evolution of the PAPRICA System," Integrated Computer-Aided Engineering 4.2,1997, pp. 114-136.
Broggi, "Robust Real-Time Lane and Road Detection in Critical Shadow Conditions," no date.
Brudigam, "Intelligente Fahrmanover sehender autonomer Fahrzeuge in autobahnahnlicher umgebung," Jun. 22, 1994.
Buehler et al., "Non-Metric Image-Based Rendering for Video Stabilization," IEEE, 2001.
Carter, "Honda's Intelligent Night Vision System", Oct. 26, 2004.
Chen, "Image Stitching Comparisons and New Techniques," Computer Science Dept. of the University of Auckland, Oct. 1998.
Chicago Sun Times, "Toyota: Cars for today and tomorrow," Section: Auto Show, Feb. 9, 1992, pp. 1-3.
Collins et al., "Calibration of an Outdoor Active Camera System," The Robotics Institute of Carnegie Mellon University, 1998.
Denyer et al., "On-Chip CMOS Sensors for VLSI Imaging Systems", Dept. of Elect. Engineering, University of Edinburgh, pp. 4b1.1-4b1.5, 1991.
Derutin et al., "Real-time Collision Avoidance at Road-Crossings on board the Prometheus-ProLab 2 Vehicle," Proceedings of the IEEE Intelligent Vehicle Symposium, 1994, France, pp. 56-61.
Dickmanns et al., "Scene Recognition and Navigation Capabilities for Lane Changes and Turns in Vision-Based Vehicle Guidance," Control Eng. Practice, vol. 4, No. 5, 1996, Great Britain.
Dickmanns et al., "The seeing passenger car 'VaMoRs-P' ", Oct. 24, 1994.
Dickmanns, "Road Vehicle Eyes for High Precision Navigation," High Precision Navigation, Diimmler Verlag, Bonn, 1995.
Dickmanns, "Dynamic Vision for Perception and Control of Motion," Springer Science & Business Media, 2007, Table of Contents, no date.
Dickmanns, "The Development of Machine Vision for Road Vehicles in the Last Decade," Intelligent Vehicle Symposium, 2002. IEEE. vol. 1. IEEE, 2002.
Dickmanns, "Vehicles Capable of Dynamic Vision: A New Breed of Technical Beings?" Artificial Intelligence, 1998.
Dickmanns, "Vision for Ground Vehicles: History and Prospects," Int. of Vehicle Autonomous Systems, vol. 1, No. 1, 2002.
Efenberger et al., "Automatic Recognition of Vehicles Approaching from Behind," Proceedings of the Intelligent Vehicles' 92 Symposium, 1992, Detroit, Michigan.
Enkelmann et al., "Obstacle Detection by Real-Time Optical Flow Evaluation," Proceedings of the IEEE Intelligent Vehicles' 94 Symposium, 1994.
Ernst et al., "Camera calibration for lane and obstacle detection" Intelligent Transportation Systems, 1999 pp. 356-361.
Fintzel et al., "3D Vision System for Vehicles," Proceedings of the Intelligent Vehicles Symposium, IEEE, 2003.
Frank, "Safety Rules the Road," Design News, Oct. 11, 2004.
Graefe et al., "A Novel Approach for the Detection of Vehicles on Freeways by Real-Time Visions," Proceedings of the IEEE Intelligent Vehicles, Tokyo, Sep. 1996.
Green, "Computer Image Processing—The Viking Experience," ASA STI/Recon Technical Report A, Jul. 29, 1977, pp. 281-299.
Gregor, "A Vision System for Autonomous Ground Vehicles with a Wide Range of Maneuvering Capabilities," International Conference on Computer Vision Systems, Springer-Verlag Berlin 2001.
Gregor, "EMS-Vision: A Perceptual System for Autonomous Vehicles," IEEE Transactions on Intelligent Transportation Systems, vol. 3, No. 1, Mar. 2002.
Gregor, "EMS-Vision: Combining on- and off-road driving," Aerospace/Defense Sensing, Simulation, and Controls. International Society for Optics and Photonics, 2001.

(56) References Cited

OTHER PUBLICATIONS

Gregor, "EMS-Vision: Mission Performance on Road Vehicles," Proceedings of the IEEE Intelligent Vehicles Symposium, Oct. 3-5, 2000.

Halme et al., "Intelligent Autonomous Vehicles 1995," International Federation of Automatic Control, Jun. 12-14, 1995, Part of Table of Contents.

Hamit, "360-Degree Interactivity: New Video and Still Cameras Provide a Global Roaming Viewpoint", Advanced Imaging, Mar. 1997, p. 50.

Harris et al., "A Combined Corner and Edge Detector," Alvey Vision Conference, vol. 15, 1988.

Haywood, "Acquisition of a Micro Scale Photographic Survey Using an Autonomous Submersible," OCEANS '86, IEEE 1986.

Hicks et al., "Panoramic Electronic Rear Vision for Automotive Applications," SAE Technical Paper Series, International Congress and Exposition, Detroit, MI, Mar. 1-4, 1999.

Hiramatsu et al., "Rearview Camera Based Parking Assist System with Voice Guidance," Society of Automotive Engineers, Inc., SAE Technical Paper 2002-01-0759, 2002.

Hock, "Wissensbasierte Fahrzengfurung mit Landmarken fur autonome Roboter," Universitate der Bundeswehr, 1994.

Hofmann, "EMS-Vision: Application to Hybrid Adaptive Cruise Control," Proceedings of the IEEE Intelligent Vehicles Symposium, Dearborn, MI, Oct. 3-5, 2000.

Hofmann, "Radar and Vision Data Fusion for Hybrid Adaptive Cruise Control on Highways," Machine Vision and Applications, Springer-Verlag, 2003.

Holt, "Integrale Multisensorielle Fahrumgebungserfassung nach dem 4D-Ansatz," Universitat der Bundeswehr München, Nov. 12, 2004.

Holt, "Tracking and Classification of Overtaking Vehicles on Autobahnen," Proceedings of the Intelligent Vehicles Symposium, IEEE, 1994.

Honda, "Honda Develops World's First Intelligent Night Vision System Able to Detect Pedestrians and Provide Driver Cautions," Honda Worldwide, Aug. 24, 2004.

Impedovo, "Progress in Image Analysis and Processing III," World Scientific, Capitolo, Monpoli, Italy, Sep. 22, 1993, Table of Contents.

Ito, "A Real Time Distance Headway Measurement Method Using Stereo and Optical Flow," Proceedings of the Intelligent Vehicles Symposium, ITTT, 1992.

Johannes, "A New Microchip Ushers in Cheaper Digital Cameras", The Wall Street Journal, Aug. 21, 1998, p. B1.

Kinzel, "Pedestrian Recognition by Modelling Their Shapes and Movements," Proc. of the 7th Intl. Conf. on Image Analysis and Processing, 1993.

Kobe, Gerry, "Hypnotic Wizardry! (interior electronics)," Automotive Industries, vol. 169, No. 5, p. 60, May, 1989.

Koyamaishi et al., "Acquisition of Position and Direction of In-Vehicle Camera for HIR System," IEEE Intelligent Vehicle Symposium, 2004.

Kujawski, "Deciding the Behaviour of an Autonomous Mobile Road Vehicle," IFAC Intelligent Autonomous Vehicles, Proceeding of the 2nd IFAC Conference on Intelligent Autonomous Vehicles, Finland, 1995.

Kumar, "Representation of Scenes from Collections of Images," Proceedings of IEEE Workshop on Representation of Visual Scenes, Jun. 24, 1995, pp. 10-17, Cambridge, MA.

Labayrade et al., "Real Time Obstacle Detection in Stereovision on Non Flat Road Geometry Through 'V-disparity" Representation, Intelligent Vehicle Symposium, 2002. IEEE. vol. 2. IEEE, 2002.

Liang, "Video Stabilization for a Camcorder Mounted on a Moving Vehicle," IEEE Transactions on Vehicular Technology, vol. 53, No. 6, Nov. 2004.

Lienert, "Fast Forward: Consepts: Tomorrow's Cars or Drives of Fancy," Chicago Tribune, Feb. 11, 1996.

Linkwitz, "High Precision Navigation 95," University of Stuttgart, Apr. 1995.

Linzmeler et al., "Pedestrian Detection with Thermopiles using an Occupancy Grid," IEEE Intelligent Transportation Systems Conference, Washington, D.C., Oct. 3-6, 2004.

Luo et al., "Pedestrian Detection in Near-Infrared Night Vision System," IEEE Intelligent Vehicles Symposium, San Diego, CA, Jun. 21-24, 2010.

Masaki, "Vision-based Vehicle Guidance," Proceedings of the 1992 International Conference on Power Electronics and Motion Control, IEEE, 1992.

Maurer, "EMS-Vision: Knowledge Representation for Flexible Automation of Land Vehicles," Proceedings of the IEEE Intelligent Vehicles Symposium, Dearborn, MI Oct. 3-5, 2000.

Miksch et al., "Automatic Extrinsic Camera Self-Calibration Based on Homography and Epipolar Geometry,", IEEE, Intelligent Vehicles Symposium (IV), 2010.

Minuro et al., "Functions and Devices of Mitsubishi Active Safety ASV," IEEE, Jun. 1996.

Miro et al., "Real-Time Image Stitching for Automotive 360° Vision Systems," Audiovisual Engineering, Barcelona, Jul. 2014.

Mori et al., "Shadow and Rhythm as Sign Patterns of Obstacle Detection," IEEE 1993.

Murphy et al., "Application of Panospheric Imaging to a Teleoperated Lunar Rover," Systems, Man and Cybernetics, Intelligent Systems for the 21st Century, IEEE, 1995.

Nissan Press Release, "Highlights of Nissan's Exhibits at the 2001 Tokyo Motor Show," Oct. 17, 2001, pp. 1-7.

Paetzold, "Road Recognition in Urban Environment," IEEE International Conference on Intelligent Vehicles, 1998.

Pellkofer et al., "EMS-Vision: Gaze Control in Autonomous Vehicles," Proceedings of the IEEE Intelligent Vehicles Symposium, Dearborn, MI, Oct. 3-5, 2000.

Pellkofer et al., "Interaction of Perception and Gaze Control in Autonomous Vehicles," Intelligent Robots and Computer Vision XX, Proceedings of SPIE, vol. 4572, 2001.

Pomerleau et al., "Rapidly Adapting Machine Vision for Automated Vehicle Steering", pp. 1927, Apr. 30, 1996.

Popular Science, "Pioneering Research Tools for Artificial Intelligence, Robot Insects," Mar. 1991.

Rasmussen, "Combining Laser Range, Color, and Texture Cues for Autonomous Road Following," IEEE Conference on Robotics for Automation, Washington, D.C., May 2002.

Regensburger, "Object Classification for Obstacle Avoidance," SPIE, vol. 1388 Mobile Robots V, 1990.

Regensburger, "Zur Erkennung von Hindernissen in der Bahn elnes Stassenfahrzeugs durch maschinelles Echtzeitsehen," Dec. 17, 1993.

Reichard et al., "A Real-time Approach to Traffic Situation Representation From Image Processing Data," Proceedings of the Intelligent Vehicles Symposium 1995.

Rembold, "Intelligent Autonomous Systems IAS-4," Proceedings of the International Conference, Germany, Mar. 27-30, 1995.

Reynaud et al., "On Board Data Fusion and Decision System Used for Obstacle Detection: 2D Vision Versus 1D Sensor Fusion," Prometheus Prochip, Proceedings of the Intelligent Vehicles Symposium, IEEE, 1994.

Rieder, "Multisensoriells Fahrzeugerkennung in einem verteilten Rechnersystem fur autonome Fahrzeuge," Oct. 24, 2000.

Risack et al., "Robust Lane Recognition Embedded in a Real-Time Driver Assistance System," IEEE International Conference on Intelligent Vehicles, 1998.

Rombaut, "Prolab 2: A Driving Assistance System," Proceedings of the 1993 IEEE/Tsukuba International Workshop on Advanced Robotics, Japan, Nov. 8-9, 1993.

Ross, "A Practical Stereo Vision System", IEEE 1993.

Saneyoshi, "3-D Image Recognition System for Drive Assistance," Proceedings of the Intelligent Vehicles' 93 Symposium, 1993.

Sasuki, "3-D Image Location Surveillance System for the Automotive Rear-View," Vehicle Navigation & Information Systems Conference Proceedings, 1994.

Schick, "Gleichzeitige Erkennung von Form und Bewegung durch Rechnersehen," Uniersitat der Bundeswehr Munchen, Jun. 6, 1992.

(56) References Cited

OTHER PUBLICATIONS

Schick, "Simultaneous Estimation of 3D Shape and Motion of Objects by Computer Vision," Proceedings of the IEEE Workshop on Visual Motion IEEE, 1991.
Schiehlen, "Kameraplattformen Fur Aktiv Sehande Fahrzeuge," Verlag, No. 514, 1995.
Schmid, "An Approach to Model-Based 3-D Recognition of Vehicles in Real-Time by Machine Vision," Proceedings of the IEEE/RSJ/GI International Conference on Advanced Robotic Systems and the Real World, vol. 3, IEEE, 1994.
Schmid, "Evaluation of Interest Point Detectors," International Journal of computer vision 37.2, Dec. 22, 2010.
Shum et al., "Panoramic Image Mosaics," Microsoft Research Technical Report, 1997.
Stenkula, "Vehicle Vicinity from Above: a Study of All-around Environment Displaying System for Heavy Vehicles," Master of Science Thesis, Stockholm, Sweden, 2009.
The 35th Tokyo Motor Show, Nissan, IDEO Article, Oct. 2001.
Thomanek et al., "Multiple object recognition and scene interpretation for autonomous road vehicle guidance" Oct. 1994.
Thomanek et al., "Obstacle Detection, Tracking and State Estimation for Autonomous Road Vehicle Guidance," Proceedings of the 1992 International Conference on Intelligent Robots and Systems, Raleigh, NC, Jul. 7-10, 1992.
Thomanek, "Visuelle Erkennung und Zustandsschatzung von mehreren Strassenfahrzeugen zur autonomen Fahrzeugfuhrung," VDI Verlag, No. 272, 1996.
Thorpe et al., "The 1997 Automated Highway Free Agent Demonstration", 1997 pp. 496-501, 1997.
Toyota Crown Majesta Undergoes Complete Resign Article, 2004.
Tsugawa et al., "Vision-based vehicles in japan; machine vision systems and driving control systems", IEEE Transactions on Industrial Electronics, vol. 41, No. 4, Aug. 1994.
Turk et al., "Video Road-Following for the Autonomous Land Vehicle," Proceedings of the IEEE International Conference on Robotics and Automation, vol. 4, 1987.
Ulmer, "VITA II—active collision avoidance in real traffic" Proceedings of the Intelligent Vehicles '94 Symposium, Oct. 24-26, 1994.
Van Leeuwen et al., "Requirements for Motion Estimation in Image Sequences for Traffic Applications", IEEE, pp. 354-359, XP002529773, 2000.
Visteon, "Innovations: Improving Nighttime Vision," Oct. 18, 2001.
Wang et al., "CMOS Video Cameras", article, 4 pages, University of Edinburgh, UK, 1991.
Wang, "Camera Calibration by Vanishing Lines for 3-D Computer Vision," IEEE Transaction on Pattern Analysis and Machine Intelligence, vol. 13, No. 4, Apr. 1991.
Williamson, "A High-Performance Vision System for Obstacle Detection," Robotics Institute, Carnegie Mellon University, 1998.
Xiong, "Error Analysis of a Real-Time Stereo System," Proceedings on the IEEE Computer Society Conference on Computer Vision and Pattern Recognition, 1997.
Yang, "Obstacle Detection in a Sequence of Rearview Images," International Conference on Information, Communications and Signal Processing ICICS, Singapore, Sep. 9-12, 1997.
Zhao, "Obstacle Detection by Vision for an Autonomous Vehicle," Proceedings of the Intelligent Vehicles Symposium, 1993.
Zhu et al., "A Real-Time Vision System for Automatic Traffic Monitoring Based on 2D Spatio-Temporal Images," Proceedings of the 3rd IEEE Workshop on Applications of Computer Vision, 1996.
Zhu et al., "Panoramic EPI Generation and Analysis of Video from a Moving Platform with Vibration," IEEE Computer Society Conference on Computer Vision and Pattern Recognition, vol. 2, 1999.
Achler et al., "Vehicle Wheel Detector using 2D Filter Banks," IEEE Intelligent Vehicles Symposium of Jun. 2004.
Behringer et al., "Simultaneous Estimation of Pitch Angle and Lane Width from the Video Image of a Marked Road," pp. 966-973, Sep. 12-16, 1994.
Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Broggi, "Vision-based Road Detection in Automotive Systems: A real-time expectation-driven approach", 1995.
Brown, A Survey of Image Registration Techniques, vol. 24, ACM Computing Surveys, pp. 325-376, 1992.
Burger et al., "Estimating 3-D Egomotion from Perspective Image Sequences", IEEE Transactions on Pattern Analysis and Machine Intelligence, vol. 12, No. 11, pp. 1040-1058, Nov. 1990.
Burt et al., A Multiresolution Spline with Application to Image Mosaics, ACM Transactions on Graphics, vol. 2. No. 4, pp. 217-236, Oct. 1983.
Cucchiara et al., Vehicle Detection under Day and Night Illumination, 1999.
Dickmanns et al., "A Curvature-based Scheme for Improving Road Vehicle Guidance by Computer Vision," University of Bundeswehr München, 1986.
Dickmanns et al., "Recursive 3-D road and relative ego-state recognition," IEEE Transactions on Pattern Analysis and Machine Intelligence, vol. 14, No. 2, Feb. 1992.
Dickmanns et al.; "An integrated spatio-temporal approach to automatic visual guidance of autonomous vehicles," IEEE Transactions on Systems, Man, and Cybernetics, vol. 20, No. 6, Nov./Dec. 1990.
Dickmanns, "4-D dynamic vision for intelligent motion control", Universitat der Bundeswehr Munich, 1991.
Donnelly Panoramic Vision™ on Renault Talisman Concept Car At Frankfort Motor Show, PR Newswire, Frankfort, Germany Sep. 10, 2001.
Franke et al., "Autonomous driving approaches downtown", Intelligent Systems and Their Applications, IEEE 13 (6), 40-48, Nov./Dec. 1999.
Greene et al., Creating Raster Omnimax Images from Multiple Perspective Views Using the Elliptical Weighted Average Filter, IEEE Computer Graphics and Applications, vol. 6, No. 6, pp. 21-27, Jun. 1986.
Honda Worldwide, "Honda Announces a Full Model Change for the Inspire." Jun. 18, 2003.
IEEE 100—The Authoritative Dictionary of IEEE Standards Terms, 7th Ed. (2000).
IPR Proceeding No. IPR2014-00221, filed Dec. 4, 2013, re U.S. Pat. No. 7,991,522.
IPR Proceeding No. IPR2014-00222, filed Dec. 4, 2013, re U.S. Pat. No. 8,386,114.
IPR Proceeding No. IPR2014-00223, filed Dec. 4, 2013, re U.S. Pat. No. 8,386,114.
IPR Proceeding No. IPR2014-00227, filed Dec. 4, 2013, re U.S. Pat. No. 7,877,175.
IPR Proceeding No. IPR2014-00228, filed Dec. 4, 2013, re U.S. Pat. No. 7,877,175.
IPR Proceeding No. IPR2014-01204, filed Jul. 25, 2014, re U.S. Pat. No. 8,386,114.
IPR Proceeding No. IPR2014-01206, filed Jul. 25, 2014, re U.S. Pat. No. 7,877,175.
IPR Proceeding No. IPR2014-01208, filed Jul. 25, 2014, re U.S. Pat. No. 7,991,522.
IPR Proceeding No. IPR2015-00960, filed Mar. 27, 2015, re U.S. Pat. No. 8,116,929.
IPR Proceeding No. IPR2015-00961, filed Mar. 27, 2015, re U.S. Pat. No. 8,116,929.
Japanese Article "Television Image Engineering Handbook, The Institute of Television Engineers of Japan", Jan. 17, 1981.
Kan et al., "Model-based vehicle tracking from image sequences with an application to road surveillance," Purdue University, XP000630885, vol. 35, No. 6, Jun. 1996.

(56) References Cited

OTHER PUBLICATIONS

Kastrinaki et al., "A survey of video processing techniques for traffic applications".
Kluge et al., "Representation and Recovery of Road Geometry in YARF," Carnegie Mellon University, pp. 114-119.
Koller et al., "Binocular Stereopsis and Lane Marker Flow for Vehicle Navigation: Lateral and Longitudinal Control," University of California, Mar. 24, 1994.
Kuhnert, "A vision system for real time road and object recognition for vehicle guidance," in Proc. SPIE Mobile Robot Conf, Cambridge, MA, Oct. 1986, pp. 267-272.
Malik et al., "A Machine Vision Based System for Guiding Lane-change Maneuvers," Sep. 1995.
Mei Chen et al., AURORA: A Vision-Based Roadway Departure Warning System, The Robotics Institute, Carnegie Mellon University, published Aug. 9, 1995.
Morgan et al., "Road edge tracking for robot road following: a real-time implementation," vol. 8, No. 3, Aug. 1990.
Nathan, Digital Video Data Handling, NASA JPL Tech Report 32-877, Pasadena, CA, Jan. 5, 1966.
Parker (ed.), McGraw-Hill Dictionary of Scientific and Technical Terms Fifth Edition (1993).
Philomin et al., "Pedestrian Tracking from a Moving Vehicle".
Porter et al., "Compositing Digital Images," Computer Graphics (Proc. Siggraph), vol. 18, No. 3, pp. 253-259, Jul. 1984.
Pratt, "Digital Image Processing, Passage—Ed.3", John Wiley & Sons, US, Jan. 1, 2001, pp. 657-659, XP002529771.
Reexamination Control U.S. Appl. No. 90/007,519, dated Jun. 9, 2005, Reexamination of U.S. Pat. No. 6,222,447, issued to Schofield et al.
Reexamination Control U.S. Appl. No. 90/007,520, dated Jun. 9, 2005, Reexamination of U.S. Pat. No. 5,949,331, issued to Schofield et al.
Reexamination Control U.S. Appl. No. 90/011,477, dated Mar. 14, 2011, Reexamination of U.S. Pat. No. 5,949,331, issued to Schofield et al.
Reexamination Control U.S. Appl. No. 90/011,478, dated Mar. 28, 2011, Reexamination of U.S. Pat. No. 6,222,447, issued to Schofield et al.
Regensburger, Uwe and Volker Graefe; "Visual Recognition of Obstacles on Roads", 1994.
Sahli et al., "A Kalman Filter-Based Update Scheme for Road Following," IAPR Workshop on Machine Vision Applications, pp. 5-9, Nov. 12-14, 1996.
Sun et al., "On-road vehicle detection using optical sensors: a review", IEEE Conference on Intelligent Transportation Systems, 2004.
Szeliski, Image Mosaicing for Tele-Reality Applications, DEC Cambridge Research Laboratory, CRL 94/2, May 1994.
Thorpe, et al., Vision and Navigation for the Carnegie-Mellon Navlab, IEEE Paper 1988.
Tokimaru et al., "CMOS Rear-View TV System with CCD Camera", National Technical Report vol. 34, No. 3, pp. 329-336, Jun. 1988 (Japan).
Toyota Motor Corporation, "Present and future of safety technology development at Toyota." 2004.
Tsugawa et al., "An automobile with artificial intelligence," in Proc. Sixth IJCAI, 1979.
Turk et al., "VITS-A Vision System for Autonomous Land Vehicle Navigation," IEEE, 1988.
Tzomakas and von Seelen, Vehicle Detection in Traffic Scenes Using Shadows, Internal report, Institut Für Neuroinformatik Bochum, Internal Report 98-06.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vellacott, Oliver, "CMOS in Camera," IEE Review, pp. 111-114 (May 1994).
Vlacic et al. (Eds), "Intelligent Vehicle Tecnologies, Theory and Applications", Society of Automotive Engineers Inc., edited by SAE International, 2001.
Wang et al., CMOS Video Cameras, article, 1991, 4 pages, University of Edinburgh, UK.
Wolberg, "A Two-Pass Mesh Warping Implementation of Morphing," Dr. Dobb's Journal, No. 202, Jul. 1993.
Wolberg, Digital Image Warping, IEEE Computer Society Press, 1990.
Zheng et al., "An Adaptive System for Traffic Sign Recognition," IEEE Proceedings of the Intelligent Vehicles '94 Symposium, pp. 165-170 (Oct. 1994).

\* cited by examiner

Rotation (Roll)

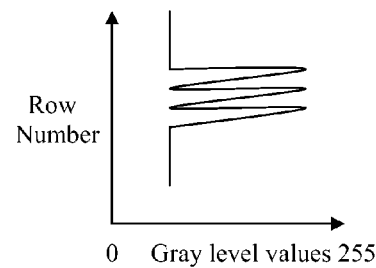 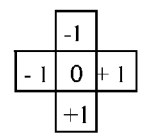
FIG. 12                FIG. 13
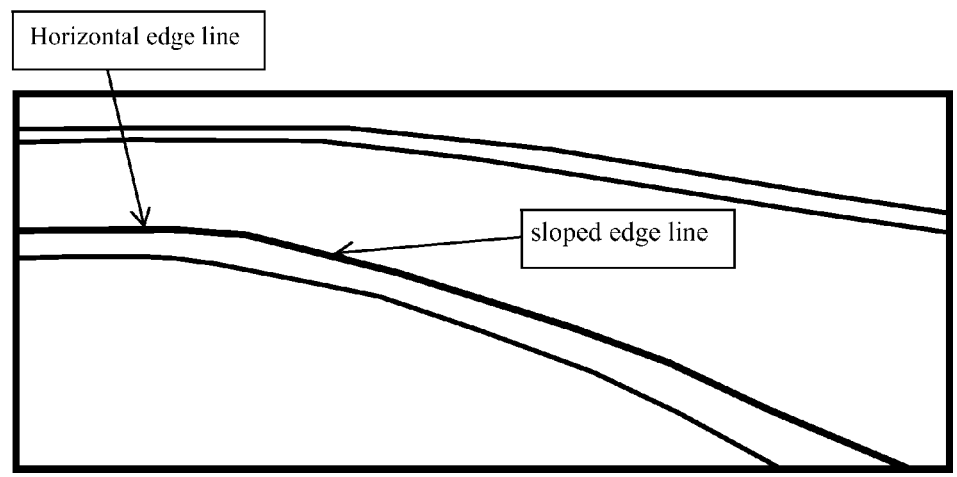
FIG. 14

DRIVER ASSISTANCE SYSTEM FOR VEHICLE

CROSS REFERENCE TO RELATED APPLICATIONS

The present application is a continuation of U.S. patent application Ser. No. 14/690,745, filed Apr. 20, 2015, now U.S. Pat. No. 9,193,303, which is a continuation of U.S. patent application Ser. No. 14/033,962, filed Sep. 23, 2013, now U.S. Pat. No. 9,014,904, which is a continuation of U.S. patent application Ser. No. 13/776,100, filed Feb. 25, 2013, now U.S. Pat. No. 8,543,277, which is a continuation of U.S. patent application Ser. No. 13/566,266, filed Aug. 3, 2012, now U.S. Pat. No. 8,386,114, which is a continuation of U.S. patent application Ser. No. 13/370,694, filed Feb. 10, 2012, now U.S. Pat. No. 8,239,086, which is a continuation of U.S. patent application Ser. No. 13/190,931, filed Jul. 26, 2011, now U.S. Pat. No. 8,116,929, which is a continuation of U.S. patent application Ser. No. 12/979,497, filed Dec. 28, 2010, now U.S. Pat. No. 7,991,522, which is a continuation of U.S. patent application Ser. No. 12/764,355, filed Apr. 21, 2010, now U.S. Pat. No. 7,877,175, which is a continuation of U.S. patent application Ser. No. 11/315,675, filed Dec. 22, 2005, now U.S. Pat. No. 7,720,580, which claims benefit of U.S. provisional application, Ser. No. 60/638,687, filed Dec. 23, 2004, which is hereby incorporated herein by reference in its entirety.

FIELD OF THE INVENTION

The present invention relates generally to vision or imaging systems for vehicles and is related to object detection systems and, more particularly, to imaging systems which are operable to determine if a vehicle or object of interest is adjacent to, forward of or rearward of the subject vehicle to assist the driver in changing lanes or parking the vehicle. The present invention also relates generally to a lane departure warning system for a vehicle

BACKGROUND OF THE INVENTION

Many lane change aid/side object detection/lane departure warning devices or systems and the like have been proposed which are operable to detect a vehicle or other object that is present next to, ahead of or rearward of the equipped vehicle or in an adjacent lane with respect to the equipped vehicle. Such systems typically utilize statistical methodologies to statistically analyze the images captured by a camera or sensor at the vehicle to estimate whether a vehicle or other object is adjacent to the equipped vehicle. Because such systems typically use statistical methodologies to determine a likelihood or probability that a detected object is a vehicle, and for other reasons, the systems may generate false positive detections, where the system indicates that a vehicle is adjacent to, forward of or rearward of the subject vehicle when there is no vehicle adjacent to, forward of or rearward of the subject vehicle, or false negative detections, where the system, for example, indicates that there is no vehicle adjacent to the subject vehicle when there actually is a vehicle in the adjacent lane.

Such known and proposed systems are operable to statistically analyze substantially all of the pixels in a pixelated image as captured by a pixelated image capture device or camera. Also, such systems may utilize algorithmic means, such as flow algorithms or the like, to track substantially each pixel or most portions of the image to determine how substantially each pixel or most portions of the image has changed from one frame to the next. Such frame by frame flow algorithms and systems may not be able to track a vehicle which is moving at generally the same speed as the equipped vehicle, because there may be little or no relative movement between the vehicles and, consequently, little or no change from one frame to the next. Because the systems may thus substantially continuously analyze substantially every pixel for substantially every frame captured and track such pixels and frames from one frame to the next, such systems may require expensive processing controls and computationally expensive software to continuously handle and process substantially all of the data from substantially all of the pixels in substantially each captured image or frame.

Many automotive lane departure warning (LDW) systems (also known as run off road warning systems) are being developed and implemented on vehicles today. These systems warn a driver of a vehicle when their vehicle crosses the road's land markings or when there is a clear trajectory indicating they will imminently do so. The warnings are typically not activated if the corresponding turn signal is on, as this implies the driver intends to make a lane change maneuver. Additionally, the warning systems may be deactivated below a certain vehicle speed. The driver interface for these systems may be in the form of a visual warning (such as an indicator light) and/or an audible warning (typically a rumble strip sound). One application warns a driver with an indicator light if the vehicle tire is crossing the lane marker and no other vehicle is detected in the driver's corresponding blind spot; and/or further warns the driver with an audible warning if the vehicle is crossing into the adjacent lane and there is a vehicle detected in the driver's blind spot.

There is concern that the current systems will be more of a driver annoyance or distraction than will be acceptable by the consumer market. Using the turn signal as the principle means of establishing to the warning system that the maneuver is intentional does not reflect typical driving patterns and, thus, many intended maneuvers will cause a warning. As a driver gets annoyed by warnings during intended maneuvers, the driver will likely begin to ignore the warnings, which may result in an accident when the warning is appropriate.

Therefore, there is a need in the art for an object detection system, such as a blind spot detection system or lane change assist system or lane departure warning system or the like, which overcomes the short comings of the prior art.

SUMMARY OF THE INVENTION

The present invention is intended to provide an object detection system, such as a blind spot detection system, a lane change assist or aid system or device, a lane departure warning system, a side object detection system, a reverse park aid system, a forward park aid system, a forward, sideward or rearward collision avoidance system, an adaptive cruise control system, a passive steering system or the like, which is operable to detect and/or identify a vehicle or other object of interest at the side, front or rear of the vehicle equipped with the object detection system. The object detection system of the present invention, such as for a lane change assist system, utilizes an edge detection algorithm to detect edges of objects in the captured images and determines if a vehicle is present in a lane adjacent to the equipped or subject vehicle in response to various characteristics of the detected edges, such as the size, location, distance, intensity, relative speed and/or the like. The system processes a subset of the image data captured which is representative of a target zone or area of interest of the scene within the field of view of the imaging system where a vehicle or object of interest is likely to be present. The system processes the detected edges within the image data subset to determine if they correspond with physical characteristics of vehicles and other objects to determine whether the detected edge or edges is/are part of a vehicle or a significant edge or object at or toward the subject vehicle. The system utilizes various filtering mechanisms, such as algorithms executed in software by a system microprocessor, to substantially eliminate or substantially ignore edges or pixels that are not or cannot be indicative of a vehicle or significant object to reduce the processing requirements and to reduce the possibility of false positive signals.

The object detection system of the present invention may capture images at a side of the vehicle and may process various windows of the images to detect a vehicle in the adjacent lane or other object, such as a bicycle, in the adjacent lane. The system may adjust the image processing to account for misalignment of the camera at the side of the vehicle. The system may adjust the area or zone of interest in response to a turning of the vehicle's wheels, such as when the vehicle is turning or curving along a curve in the road. The system may distinguish between vehicles or other objects and shadows of objects/vehicles so that a shadow of a vehicle two lanes over may not be considered a vehicle in the adjacent lane. The system may switch between daytime and nighttime algorithms and may be operable to detect headlamps of vehicles in the adjacent lane.

According to an aspect of the present invention, an imaging system for a vehicle includes an imaging array sensor and a control. The image array sensor comprises a plurality of photo-sensing pixels and is positioned at the vehicle with a field of view exteriorly of the vehicle. The imaging array sensor is operable to capture an image of a scene occurring exteriorly of the vehicle. The captured image comprises an image data set representative of the exterior scene. The control algorithmically processes the image data set to a reduced image data set of the image data set. The control processes the reduced image data set to extract information from the reduced image data set. The control selects the reduced image data set based on a steering angle of the vehicle.

Optionally, the control may process the reduced image data set with an edge detection algorithm to extract information from the reduced image data set. The image sensor may be one of (a) part of an exterior rearview mirror assembly of the vehicle and with a field of view at least partially sideward of the vehicle, and (b) at an upper windshield area and behind the windshield of the vehicle and with a field of view forward and through the windshield (such as at an area that is cleaned by the windshield wiper or wipers of the vehicle when the windshield wipers are activated). Optionally, the image sensor may be part of an exterior rearview mirror assembly of the vehicle and with a field of view at least partially sideward of the vehicle, wherein the imaging system comprises a side object detection system for detecting objects at a side of the vehicle. Optionally, the image sensor may be at an upper windshield area and behind the windshield of the vehicle and with a field of view forward and through the windshield, wherein the imaging system comprises a lane departure warning system.

Therefore, the present invention provides an imaging system for use as or in association with a side object detection system and/or a lane departure warning system. The system is operable to process captured image data of a scene occurring exteriorly and along one or both sides of the vehicle to determine if a target vehicle or object of interest is located at or in the lane adjacent to the subject or host vehicle. The imaging system of the present invention may process zones or areas of interest in the captured images and may adjust processing to accommodate any misalignment of the camera that may occur during installation of the camera at the side of the vehicle. The side object detection system may also select or adjust the image processing to select/adjust the areas of interest, such as in response to a steering angle of the vehicle, such as a turning of the wheels of the vehicle, so that the zone or area is adapted for the turning of the subject vehicle. The imaging system of the present invention thus provides enhanced processing of captured images to provide the desired function of the imaging system or associated control or control system or alert system.

These and other objects, advantages, purposes and features of the present invention will become apparent upon review of the following specification in conjunction with the drawings.

BRIEF DESCRIPTION OF THE DRAWINGS

FIG. 12 is a plot of the gray level values of the rows of pixels as a result of a wide line integration in accordance with the present invention;

FIG. 13 is a processing mask for processing the windows of the captured images using gradient calculations in accordance with the present invention;

FIG. 14 is a representation of a captured image showing the shadow of the vehicle in the area adjacent to the vehicle;

DESCRIPTION OF THE PREFERRED EMBODIMENTS

Figure 1:
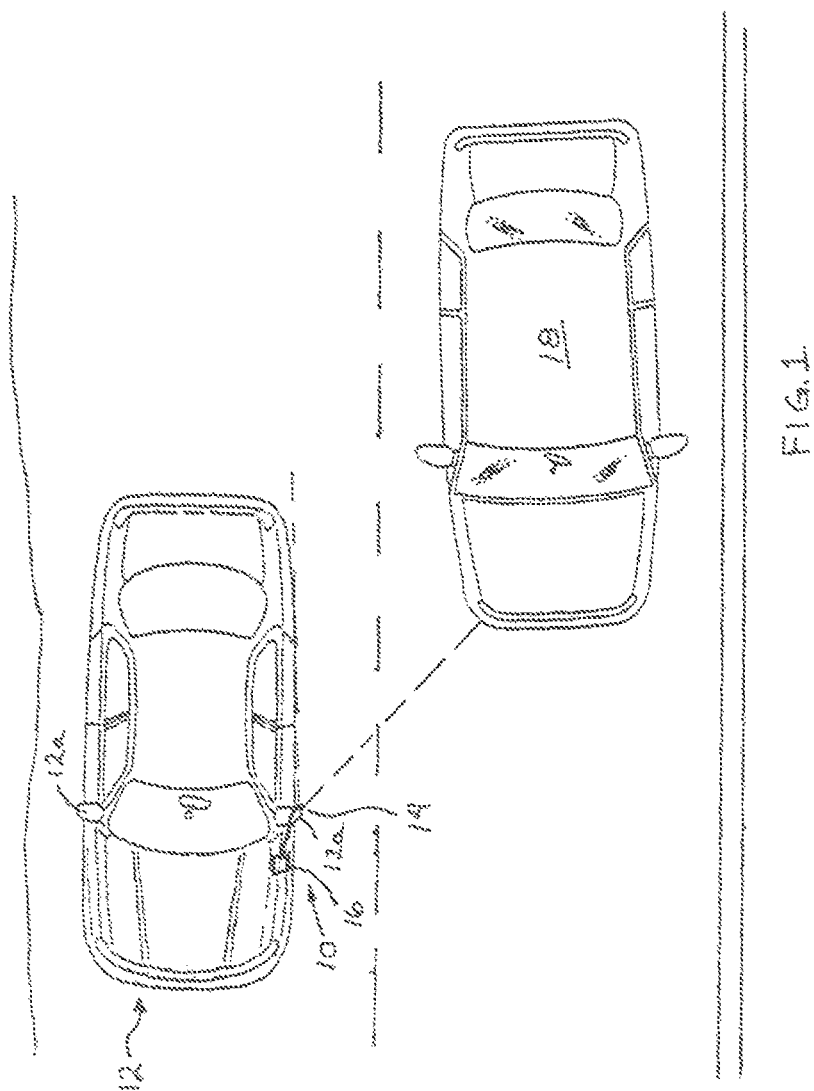
FIG. 1 is a top plan view of a vehicle incorporating the object detection system of the present invention.

Referring now to the drawings and the illustrative embodiments depicted therein, an object detection system or imaging system, such as a lane change assist or aid system 10, is positioned at a vehicle 12 (such as at an exterior rearview mirror 12a of a vehicle) and is operable to capture an image of a scene occurring sidewardly and rearwardly at or along one or both sides of vehicle 12 (FIG. 1). Lane change assist system 10 comprises an image capture device or sensor or camera 14, which captures an image of the scene occurring toward a respective side of the vehicle 12, and a control 16, which processes the captured image to determine whether another vehicle 18 is present at the side of vehicle 12, as discussed below. Control 16 may be further operable to activate a warning indicator or display or signal device to alert the driver of vehicle 12 that another vehicle is present at the side of vehicle 12. The warning or alert signal may be provided to the driver of vehicle 12 in response to another vehicle being detected at the blind spot area (as shown in FIG. 1) and may only be provided when the driver of vehicle 12 actuates a turn signal toward that side or begins turning the subject vehicle 12 toward that side to change lanes into the lane occupied by the other detected vehicle 18. The control and imaging system may utilize aspects described in U.S. patent application Ser. No. 10/427,051, filed Apr. 30, 2003, now U.S. Pat. No. 7,038,577, which is hereby incorporated herein by reference. Reference is made to U.S. patent application Ser. No. 10/427,051, for a discussion of image processing techniques and control functions useful with the present invention.

Optionally, the imaging system and object detection system of the present invention may utilize aspects of the imaging systems or detection systems of the types described in U.S. Pat. Nos. 5,929,786 and/or 5,786,772, and/or U.S. patent application Ser. No. 10/427,051, filed Apr. 30, 2003, now U.S. Pat. No. 7,038,577; and/or Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; and/or Ser. No. 60/618,686, filed Oct. 14, 2004, or of the reverse or backup aid systems, such as rearwardly directed vehicle vision systems utilizing principles disclosed in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003, now U.S. Pat. No. 7,005,974, or of automatic headlamp controls, such as the types described in U.S. Pat. Nos. 5,796,094 and/or 5,715,093; and/or U.S. patent application Ser. No. 11/105,757, filed Apr. 14, 2005, now U.S. Pat. No. 7,526,103; and U.S. provisional applications, Ser. No. 60/607,963, filed Sep. 8, 2004; and Ser. No. 60/562,480, filed Apr. 15, 2004, or of rain sensors, such as the types described in U.S. Pat. Nos. 6,250,148 and 6,341,523, or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999, now U.S. Pat. No. 7,339,149, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference.

As disclosed in U.S. Pat. No. 5,670,935 (incorporated by reference above), an imaging system of the present invention comprises a vehicle vision system including at least two side image capture devices positioned, respectively, on opposite sides of an equipped vehicle and a center image capture device positioned on the lateral centerline of the vehicle. The vehicle vision system additionally includes an image processor for receiving data signals from image capture devices and synthesizing, from the data signals, a composite image which is displayed on a display.

The images captured by image capture devices are juxtaposed on the display by the image processor in a manner which approximates the view from a single virtual image capture device. The vehicle vision system provides a substantially seamless panoramic view without redundant images of objects. The displayed image provides a sense of perspective, which enhances the ability of the driver to judge location and speed of adjacent trailing vehicles.

A left overlap zone and a right overlap zone exist where the horizontal fields of view of the side image capture devices intersect the field of view of the center image capture device. Each overlap zone defines an area within which an object will be captured both by the center image capture device and one of the side image capture devices.

An image display device displays a composite image made up of a left image portion, a right image portion, and a center image portion. Each image portion is reversed from the image as captured by the respective image capture device utilizing conventional techniques. These techniques include reading the image in reverse with the image capture device, writing the image in reverse to the display device, or reversing the image in the image processor. The left image portion is joined with the central image portion at a boundary. The central image portion is joined with the right image portion at a boundary. The image portions at the boundaries are continuous whereby the composite image is a seamless panoramic view. The central image portion is narrower than either the left image portion or the right image portion. The composite image provides a clear image, which avoids confusion.

The display is preferably positioned within the driver's physiological field of view without obstructing the view through the windshield. It is known that the driver's field of view, with the head and eyes fixed forward, extends further in a downward direction than in an upward direction. The display could be located above the vertical view through the windshield wherein the display may be observed at the upward portion of the driver's field of view. However, the position for the display is preferred wherein the display is within the lower portion of the driver's field of view.

The display is a flat panel display, such as a back-lit liquid crystal display, a plasma display, a field emission display, or a cathode ray tube.

Each image-capturing device is controlled by appropriate supporting electronics located in the vicinity of the imaging array such that, when operating power is supplied, either an analog or a digital data stream is generated on an output signal line supplied to the image processor. The support electronics may be provided partially on the image chip and partially on associated electronic devices. For each exposure period, a value indicative of the quantity of light incident on each pixel of the imaging array during the exposure period is sequentially outputted in a predetermined sequence, typically row-by-row. The sequence may conform to video signal standards which support a direct view such that, when a scene is viewed by an image-capturing device, the image presented on a display represents directly the scene viewed by the image-capturing devices.

Data transmission between image capture devices and the image processor and/or between the image processor and the display may be by electrically conductive leads or fiber-optic cable.

The data streams from image-capturing devices are combined in the image processor and directly mapped to the pixel array of display. The image captured by the side image capture device on the right side of the vehicle is presented on a right image portion and the image from the side image capture device on the left side of the vehicle is displayed on a left image portion. The image from the center image capture device is displayed on a central image portion. The three image portions are presented in horizontal alignment and adjacent to each other. However, the composite image may be positioned at any desired vertical position in the display.

The image sensor may be located at the vehicle so as to have a sideward field of view, such as at an exterior rearview mirror of the vehicle, such as generally or at least partially within an exterior rearview mirror of the vehicle. For example, an image sensor may be located within an exterior rearview mirror assembly of the vehicle and may have a generally rearwardly and sidewardly field of view through a transflective reflective element of the exterior rearview mirror assembly. In such an application, the image sensor may be incorporated in or associated with a side object detection system that detects objects at a side or blind spot area of the controlled or subject vehicle. Optionally, the image sensor may have a generally forward field of view to capture images of a scene occurring forwardly of the vehicle. The image sensor may be located within the vehicle cabin and rearward of the windshield so as to have a field of view forwardly and through the windshield of the vehicle, preferably at a location that is cleaned by the windshield wipers of the vehicle, such as at an interior rearview mirror assembly of the vehicle or at an accessory module or windshield electronics module or the like. In such an application, the image sensor may be incorporated in or associated with a lane departure warning system that detects a departure of the controlled or subject vehicle from a lane as the vehicle travels along a road.

Figure 2:
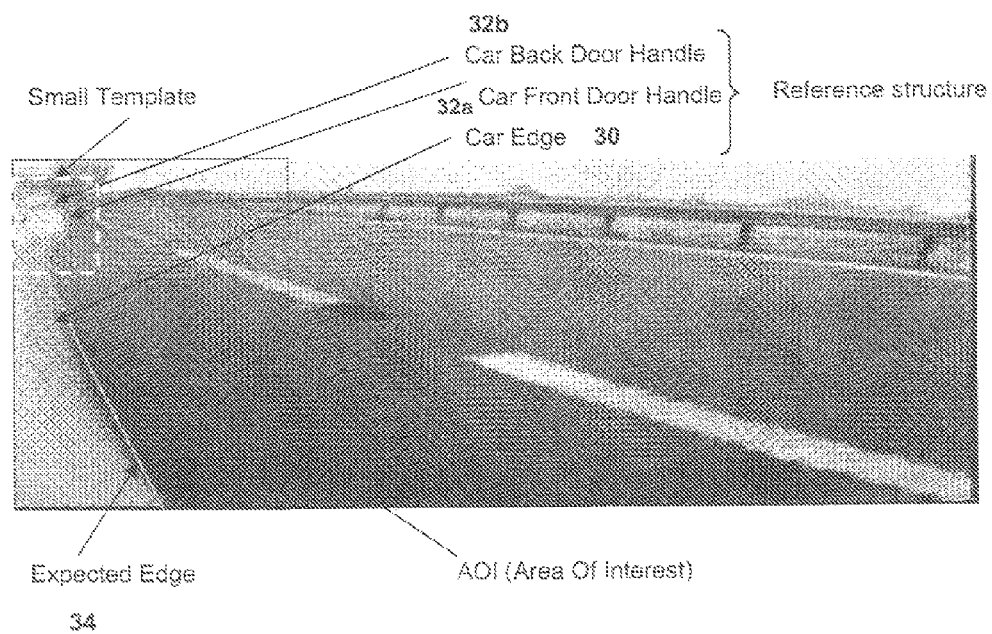
FIG. 2 is a representation of a captured image of a side area of a vehicle as captured by an imaging sensor in accordance with the present invention.

Camera Calibration:

In order to verify that the camera or imaging sensor is mounted at the vehicle (such as at an exterior portion of the vehicle) within a desired tolerance limit so as to provide the desired field of view, the camera may detect the side of the vehicle (shown at 30 in FIG. 2) and/or the door handle or handles (the front door handle is shown at 32a in FIG. 2, while the rear door handle is shown at 32b in FIG. 2) of the vehicle and the control may confirm that they are in the expected location in the captured images. If the control determines that the camera is not aligned or aimed at the desired location (such as by determining that the vehicle edge and/or door handle/handles are not at the expected location), the control may adjust the image and/or image processing to account for any such misalignment of the camera. For example, the degree of misalignment may be calculated, and the image processing may be adjusted or shifted and/or rotated to position the reference structure at the appropriate location in the captured images.

Figures 3A, 3B:
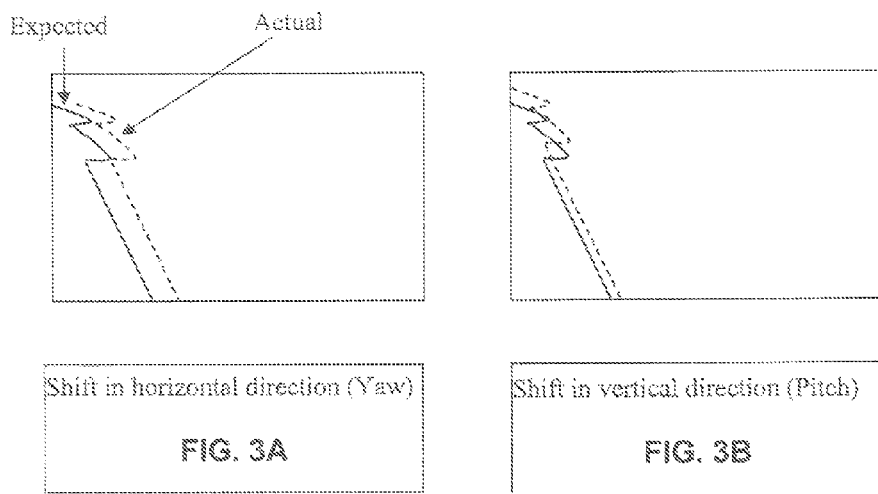
FIGS. 3A-C are schematics of the captured image of FIG. 2 showing the adjustments that may be made to the image processing to account for misalignment of the image sensor.
Figure 3C:
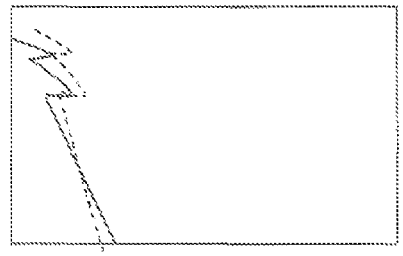

For example, the algorithm may function to preprocess the captured image by a histogram equalization to improve the image contrast. The algorithm may then process the captured images via an edge detection in the area of interest to extract the expected edge of the vehicle (shown at 34 in FIG. 2). The algorithm may filter the image data to remove noise in the edge detected image. The algorithm may perform a coarse structure fitting (such as via a line fitting algorithm or contour fitting algorithm or the like) of the vehicle side and door handles in the captured image for verifying the camera mounting is within the desired or appropriate tolerance limit. The algorithm may further perform a fine structure fitting (such as via a correlation algorithm or contour fitting algorithm or the like) for calculating shift in yaw, pitch and roll. As shown in FIGS. 3A-C, the actual or detected vehicle edges may be misaligned or separated from the expected vehicle edges, such that the image processing may be adjusted to shift the captured image data accordingly to accommodate such misalignment of the camera. Based on the results of the image processing techniques, data or information of the yaw, pitch and roll may be used to set the polygon co-ordinates and H depression pixel calibration parameters, so that the expected vehicle edges are substantially aligned with the actual or detected vehicle edges.

After the image data or image processing is adjusted to account for any misalignment of the camera at the vehicle, the camera may capture images of the scene occurring exteriorly of the vehicle and at that side of the vehicle, and the control may process the images to detect objects or lane markers or the like at the side of the vehicle and/or rearward of the vehicle, and may utilize aspects described in U.S. patent application Ser. No. 10/427,051, filed Apr. 30, 2003, now U.S. Pat. No. 7,038,577, which is hereby incorporated herein by reference.

Figure 4:
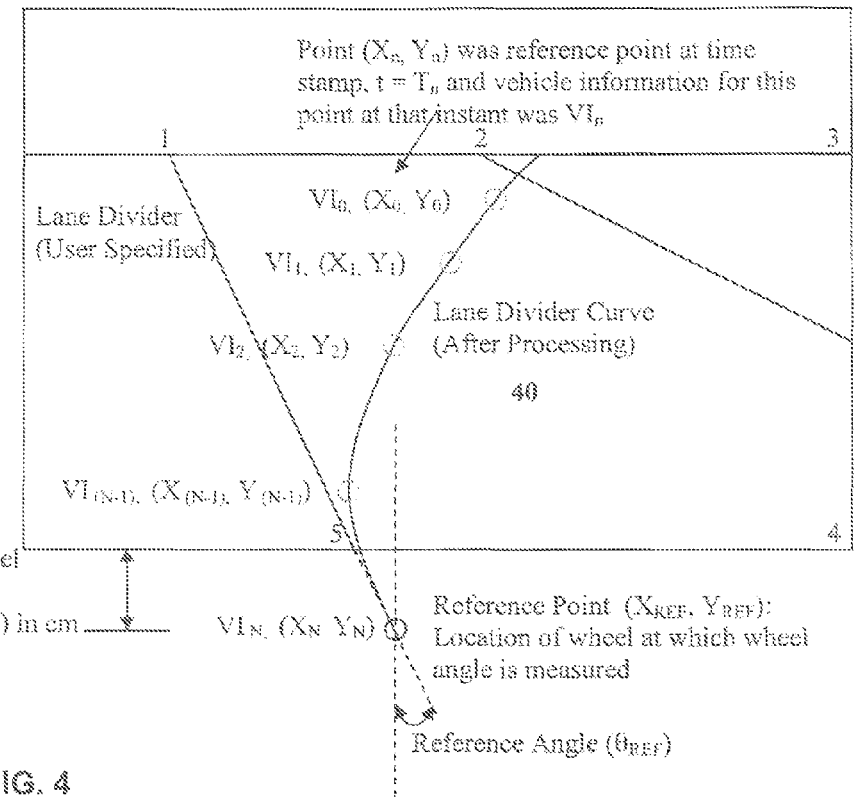
FIG. 4 is a schematic showing an adjustment of the area of interest when the wheels of the subject vehicle are turned.
Figure 5:
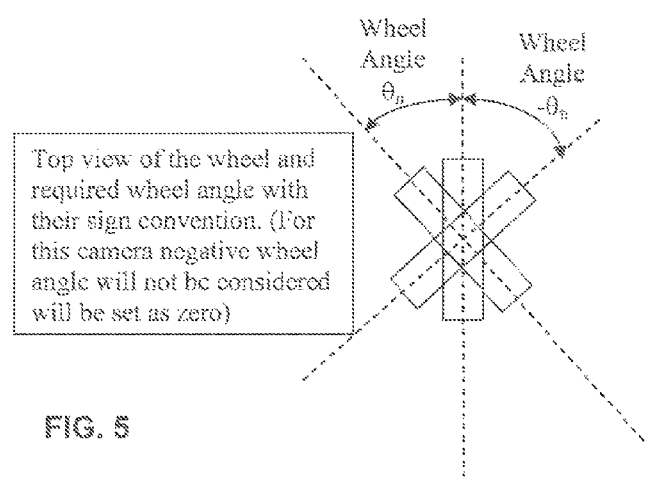
FIG. 5 is a plan view of one of the wheels of the subject vehicle showing the angles of the wheel as it is turned.
Figure 6:
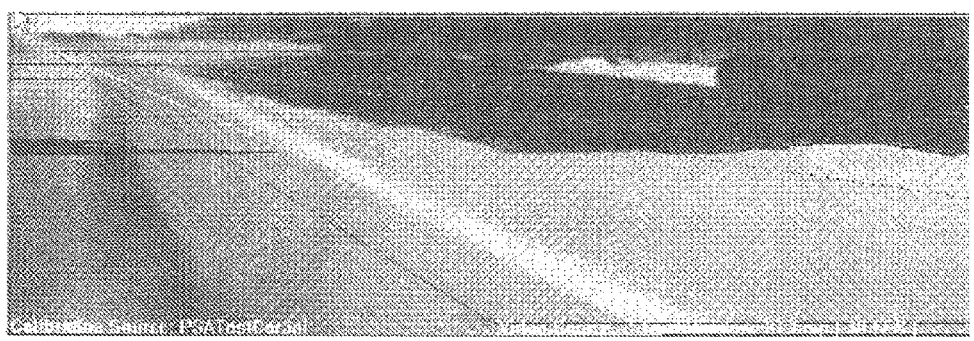
FIGS. 6-9 are representations of captured images of the side area of the vehicle, showing how different shadows may be detected.
Figure 7:
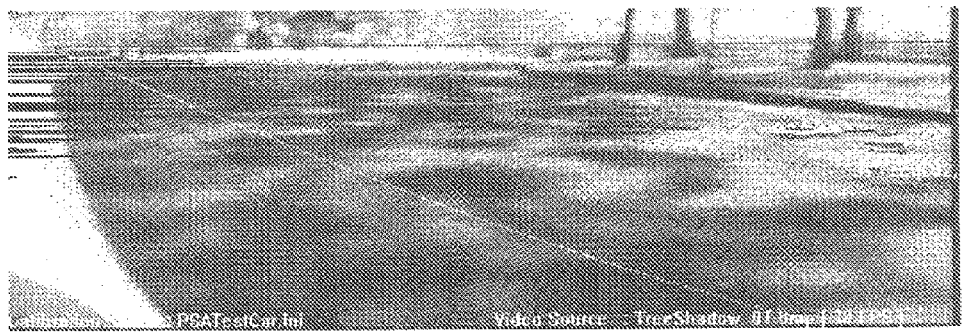
Figure 8:
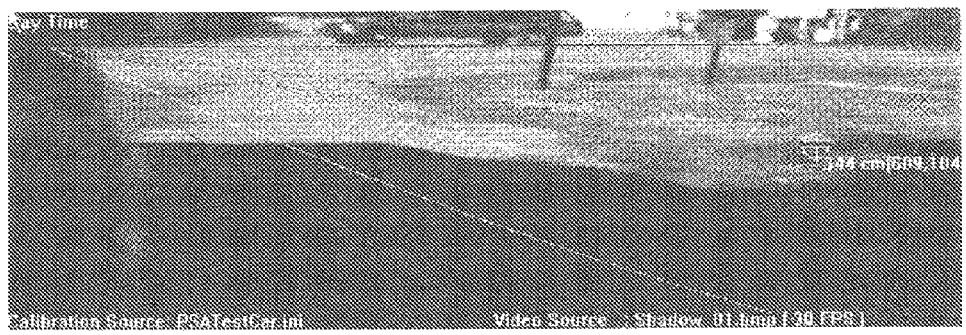

Adjustment of Zone when Vehicle Turning:

Optionally, the control may perform a curve processing or lane divider curve fitting function to select or adjust the reduced image set or zone of interest based on a steering angle of the vehicle (the angle at which the vehicle is steered to either side relative to the longitudinal axis of the vehicle), such as when the front wheels of the subject vehicle are turned. The curve processing function may adjust the zone of interest based on the degree of turning of the steering wheel (or other characteristic indicative of the steering angle of the vehicle) so that areas or regions outside of a revised curve may not be processed or considered as much as the areas or regions within the revised curve. Based on the history of host vehicle information (such as vehicle speed and wheel angle), the control may modify the slope of the adjacent lane divider (at the left side of user specified area of interest) at different positions. As shown in FIG. 4, when the wheels are turned at an angle θ, the control may determine a new curved line 40 that represents the edge of the zone or area of interest. This modification will convert straight line 1-5 in FIG. 4 to the curve 40. Detected targets or objects outside this curve (i.e., to the left of the curve in FIG. 4) will not be considered for the mapping or object detection. As shown in FIG. 5, the wheel angle may be determined by the rotation or pivoting or turning of the front wheels of the vehicle about their generally vertical axis (which may be detected by a rotational measuring device or the like), and the curve may be adjusted as a function of the vehicle speed (such as determined via a wheel speed sensor or the like) and the wheel angle θ.

The following vehicle information history table (VIHT) with the history of multiple (N) frames or captured images may be maintained for fitting of a curve. The table may be updated when the vehicle information is available for each frame.

| Frame | Host Vehicle Information ($VI_n$) | | | | | | |
|---|---|---|---|---|---|---|---|
| Index/ Time Stamp $T_n$ | Speed $V_n$ | Wheel Angle $\theta_n$ | Cumulative Wheel Angle $\theta_{Cn}$ | Point on Curvature (cm) | | Point on Curvature (pixels) | |
| | | | | $X_n$ | $Y_n$ | $X_{Pn}$ | $Y_{Pn}$ |
| $T_0$ | $V_0$ | $\theta_0$ | $\theta_{C0}$ | $X_0$ | $Y_0$ | $X_{P0}$ | $Y_{P0}$ |
| $T_1$ | $V_1$ | $\theta_1$ | $\theta_{C1}$ | $X_1$ | $Y_1$ | $X_{P1}$ | $Y_{P1}$ |
| $T_2$ | $V_2$ | $\theta_2$ | $\theta_{C2}$ | $X_2$ | $Y_2$ | $X_{P2}$ | $Y_{P2}$ |
| ⋮ | ⋮ | ⋮ | ⋮ | ⋮ | ⋮ | ⋮ | ⋮ |
| $T_{N-1}$ | $V_{N-1}$ | $\theta_{N-1}$ | $\theta_{C(N-1)}$ | $X_{N-1}$ | $Y_{N-1}$ | $X_{P(N-1)}$ | $Y_{P(N-1)}$ |
| $T_N$ | $V_N$ | $\theta_N$ | $\theta_{CN} = \theta_{REF}$ | $X_N = X_{REF}$ | $Y_N = Y_{REF}$ | $X_{PN}$ | $Y_{PN}$ |

During operation, the control may perform the following computations:
1. Compute Reference Angle ($\theta_{REF}$) using polygon vertices (1 & 5).
2. Compute Reference Point ($X_{REF}$, $Y_{REF}$) using Reference Angle ($\theta_{REF}$) and Mirror Wheel Separation Distance (D).
3. For each frame update (add in the circular buffer) following VIHT entries:
    a. Frame Index or Time Stamp ($T_n$);
    b. Host Vehicle Speed ($V_n$); and
    c. Host Vehicle Wheel Angle ($\theta_n$) (note that this angle may be considered without doing any perspective correction, but may require appropriate correction to be added based on height and angle of inclination of the camera).
4. Compute Cumulative Wheel Angle ($\theta_{cn}$):

$$\theta_{CN} = \theta_{REF};$$
$$\theta_{C(N-1)} = \theta_{N-1} + \theta_{CN};$$
$$\theta_{C(N-2)} = \theta_{N-2} + \theta_{C(N-1)};$$
$$\theta_{C(N-3)} = \theta_{N-3} + \theta_{C(N-2)};$$
$$\vdots$$
$$\theta_{C0} = \theta_0 + \theta_{C1}.$$

5. Compute curve points ($X_n$, $Y_n$) (such as in cm):
    The n=N curve point is a reference point and for all other points the following equations may be used to compute the curve points:

$$Y_{N-1} = F1(T_{N-1}, V_{N-1}, Y_N); \text{ and}$$

$$X_{N-1} = F2(\theta_{C(N-1)}, Y_{N-1}, X_N, Y_N).$$

Preferably, the functions F1 and F2 are relatively simple trigonometric functions.
6. Replace the curve point ($X_0$, $Y_0$) with the intersection point of the curve and the horizon, and preferably do not allow the curve to cross the horizon.
7. For display purposes, compute the curve points ($X_{Pn}$, $Y_{Pn}$) in pixels using the existing cm-pixel relations (CMDistances and PixelSomethingThreshold)

In a preferred embodiment, the steps 1 and 2 above may be a one time computation in the initialization part of the algorithm, while the steps 3-6 are preferably executed during the run-time of the system, and the step 7 preferably is executed in the debug mode for the testing.

Vertical Edge Detection:

Optionally, the object detection system may be operable to detect vertical edges of objects in the field of view of the camera. Such an approach may be useful in detecting target vehicles when the front of the target vehicle is not visible, such as when the target vehicle is alongside the subject vehicle.

The vertical edge detection algorithm may be performed first at a low level Processing. During such low level processing, the vertical edge detection may be applied to an input image, and a noise filtering algorithm may be applied to the edge image. The lateral X histogram may be calculated and analyzed, and any non-significant edge counts may be removed from the histogram. The histogram may be normalized and analyzed to identify probable targets, a different ID may be given for a vertical edge detected target for use during high level processing.

During the high level processing, a map of target information for vertical targets may be generated, such as in a similar manner as for horizontal edge detected targets (such as described in U.S. patent application Ser. No. 10/427,051, filed Apr. 30, 2003, now U.S. Pat. No. 7,038,577, which is hereby incorporated herein by reference, and such as described below). The targets may be filtered out based on various criteria (such as relative speed, number of frames present and/or the like), and a warning may be raised or generated if the object is detected at the side of the vehicle.

Such vertical edge detection functions may be desirable, since a target vehicle's trunk may generate a significant vertical edge. Also, the vertical edges may substantially always be present in both the daytime and nighttime hot zones. Furthermore, tree shadows, lane markings and other structures may be filtered out using such vertical edge detection.

Qualification During Daytime:

Side Object Detection works based on the edges detected. Horizontal edges are used to detect and track vehicle. The detected edges are qualified based on a robust high level vision algorithm, such as the algorithms described in U.S. patent application Ser. No. 10/427,051, filed Apr. 30, 2003, now U.S. Pat. No. 7,038,577, which is hereby incorporated herein by reference. Vertical edges are being used to detect vehicles close to the camera/passing vehicles, as discussed above.

However, the vehicle identification may be based on the shadow created by the vehicle (for day time operation). A detected shadow could be created by a target vehicle entering into the blind spot or static objects like guard rails or structures on the road side or by the self shadow (of the subject vehicle) or of vehicles passing more than one lane away. It is difficult to identify whether or not the shadow is by a target vehicle entering into the blind spot. Thus, a positive identification or qualification of the edges can help in reducing false alarms.

Figure 9:
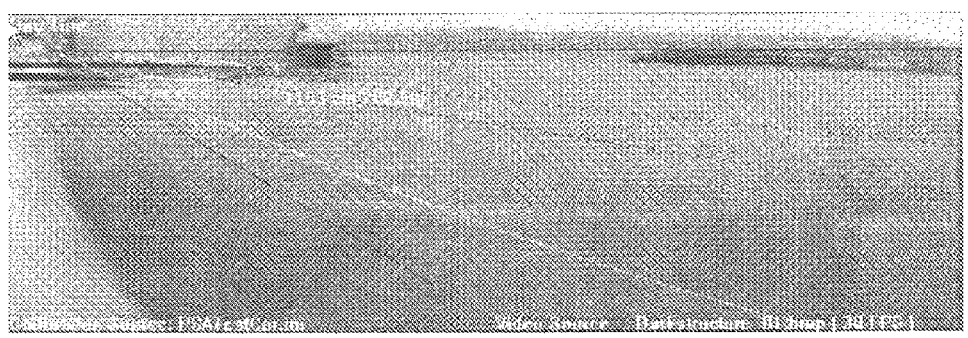

When a shadow is detected, it is either a shadow created by a vehicle entering into the blind spot, or a shadow created by something else and not the target vehicle (a vehicle entering the blind spot). Referring to FIGS. 6-9, different shadows are shown for different scenarios the system may encounter, such as, for example, the shadow cast by a truck that is one or more lanes over from the target lane (FIG. 6), shadows cast by trees alongside the road (FIG. 7), the shadow cast by the subject vehicle (FIG. 8), and/or dark structures (FIG. 9).

In the case where the shadow is created by something other than the target vehicle, the following characteristics may be assumed:
1. Below the edge (for horizontal edges) the road may have full illumination by daylight, and above the horizontal edge there will be road where daylight is partially occluded by some objects (so lesser illumination); or
2. Below the edge the road may be darker because of partial occlusion by some object causing the shadow, and above the edge the road may have full daylight illumination;
3. The above two scenarios are similar for the areas to the left and right of a vertical shadow.

Therefore, the following characteristics can also be assumed:
1. Above and below the edges there is road;
2. To the left and right of a vertical edge there is road;
3. One side of the edge is not road but is a vehicle.

The problem is that it has heretofore been difficult to distinguish between the shadow and the vehicle. The proposed methodology is intended to increase the confidence in decision. For example, the situations in FIGS. 6 and 7 may cause the system to indicate that it is a false positive (host or self shadow removal (discussed below) will also be resolved), while the situation in FIG. 8 may cause the system to indicate that the edge is due to a vehicle. The situation in FIG. 9 may result in the system indicating that it could not decide so the existing algorithm should continue to process the images.

In order to qualify a detected edge, the system of the present invention may perform the following processing steps:
1. Histogram Analysis:
    display the edge pixels within the hot zone;
    determine the start and the endpoint of an edge;
    create processing windows on either side of the edge; and
    perform wide line integration.

Figure 10:
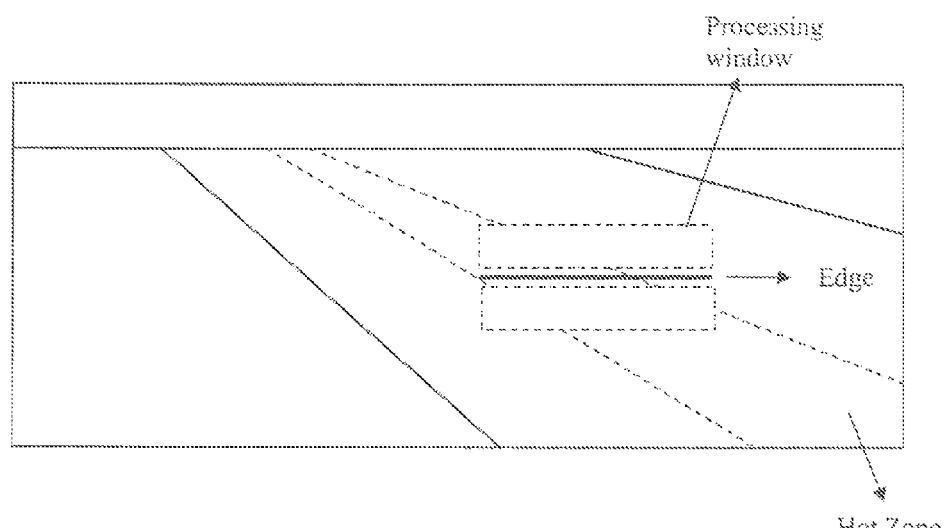
FIG. 10 is a schematic of the image processing windows useful in processing the captured images in accordance with the present invention.
Figure 11:
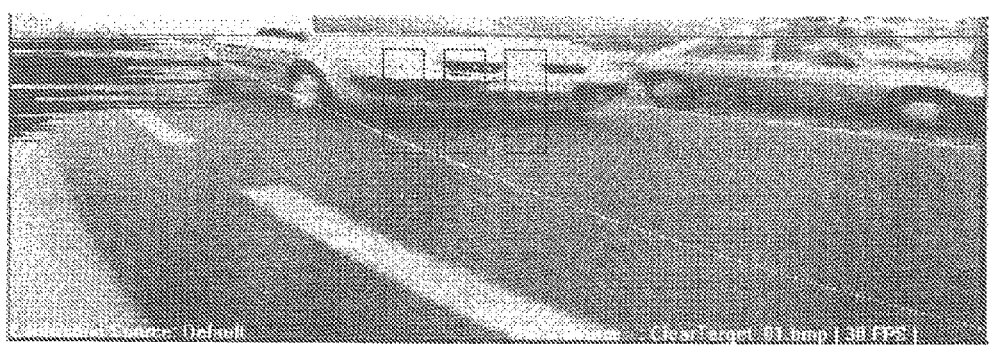
FIG. 11 is a representation of a captured image of the side area of the vehicle, showing different processing windows used to detect the vehicle in the adjacent lane.

For Example, and as shown in FIGS. 10 and 11, a plurality of processing windows may be applied at either side of a detected edge. A plot as a result of the wide line integration is expected to be as shown in FIG. 12. The variations in the plot are expected to provide insight in qualifying an edge.
2. Extracting unique features across the edge (mean and range):
    display the edge pixels within the hot zone;
    determine the start and the endpoint of an edge;
    estimate unique features to qualify an edge such as mean and range; and
    analyze variations in mean and range on either side of the edge.

Comparison of the mean and range of the processing windows across a detected edge is expected to give insight in qualifying an edge.
3. Gradient analysis across the detected horizontal edge:
    display the edge pixels within the hot zone;
    determine the start and the endpoint of an edge;
    gradient calculations are done on the processing windows using local window operators, such as Sobel operators of the mask shown in FIG. 13; and The gradient magnitude gives the amount of the difference between pixels in the neighborhood (the strength of the edge). The gradient orientation gives the direction of the greatest change, which presumably is the direction across the edge (the edge normal). Comparison of the gradient across the edge is expected to provide insight in qualifying an edge.

Host Shadow Removal:

In side object detection, the host shadow of the vehicle may be detected as a target vehicle if the host shadow is extended in the hot zone (or zone or area of interest alongside the subject or host vehicle). Often, the host shadow may fall on the adjacent lane in the morning or evening time. The host shadow consists of a straight horizontal edge and an edge line with some slope, such as shown in FIG. 14.

The steps involved in processing the image to remove or ignore the host shadow include:
    obtain the target list at the output of processframe( );
    for each target, get the row value (y_Pixel);
    trace for the horizontal edge line around this row value;
    check whether this line is continuous, starting from the subject vehicle body (approximately) and up to and after the lower border of the hot zone;
    check whether this horizontal edge is extended in the hot zone and has a significant pixel count in the hot zone (check against the pixelsomething threshold for that particular line);
    start tracing for the sloped edge line at the end of this horizontal edge;
    if the sloped line is present for some columns it means that there is a host shadow; and
    if there is a host shadow, remove the corresponding target from the target list.

Note that this process may be applied before calculating the target list, so that the host shadow edge pixel count can be subtracted from the line counts. In such an application, all the lines may be scanned until the detection of the host shadow. Vertical edge calculations may not be needed for this process, since, often, if the horizontal edge line of the host shadow is present in the hot zone then the host shadow is getting detected.

Bicycle Detection:

The side object detection system may be operable to detect other objects, such as a bicycle in the zone of interest. For a bicycle, there are small edges compared to a target vehicle, since the bicycle tire is small. In order to detect and track such small edges, we need to tune some of the parameters. For example, some or all of the following listed parameters may be changed to enhance the ability of the system to detect a bicycle:
    SOMETHING_SIZE_CM: some size of the object in cms for reference (Calibration.h);
    gCalibration.SMOOTHING_ALG_THRESHOLD: threshold applied on the peak normal force of the vehicle to see if the detected vehicle was significant (FindEdgePeaks_A( ));
    gCalibration.XFILTER_FACTOR: with the pixelsomething threshold of a line, it decides the minimum number of horizontal pixels required for a valid object/target (XFilterNew( ));

gCalibration.HOT_ZONE_COUNT_THRESHOLD_DI-
VISOR: divisor factor of pixel something threshold of
a line at the time of detection of valid objects (ComputeLineCountsR( ));
gCalibration.X_MUST_WARN: the maximum distance
for a target to create a warning (when a target is located
inside this position (Target X<X Must Warn), a warning
for that target may be displayed);
gCalibration.VD_HYSTERESIS_ON: threshold (normal
force) at which the algorithm determines a starting
point of a target (FindEdgePeaks_A( ));
gCalibration.VD_HYSTERESIS_OFF: threshold at
which the algorithm determines the falling off point of
a target (FindEdgePeaks_A( ));
gCalibration.LINEERROR: this is the difference between
the projected distance and actual distance of a particular target (i.e. line mapping error).

With the parameter tuning, the system may detect many false edges as well. In order to reduce such false edge detections, the vertical edge detection may be used as an additional feature.

Vertical Edge Detection:
detect the vertical edges for the frame in the area of interest region;
the vertical edge image is scanned for the connected pixels along the columns;
the maximum connected pixels count is compared against the threshold;
based on the comparison result, the decision is made as to whether the target is present or absent.

The vertical edge image may be scanned in the following regions:
Lower limit: the lower limit of the area of interest;
Upper limit: the upper boundary of the nighttime hot zone (FarCenterIndices_N).

This is to reduce or substantially avoid a false vertical edge detection of objects outside the adjacent lane. The vertical edges may correspond to the wheels. When the target vehicle is far away, the vertical edge count will be small, and when the target vehicle is closer, the vertical edge count will be greater. A threshold count may be selected to provide the desired accuracy of the system.

Figure 15:
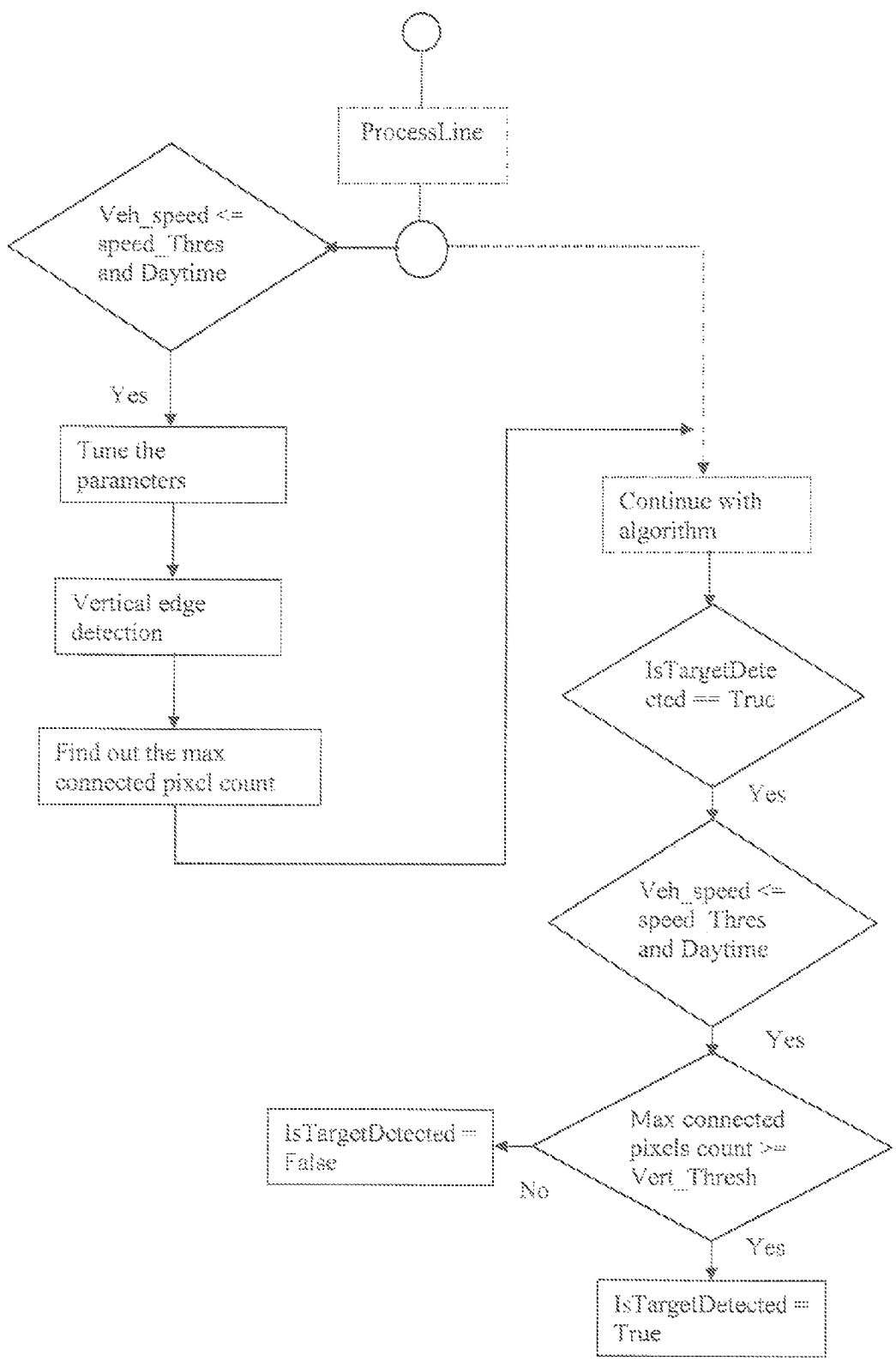
FIG. 15 is a process flow diagram showing the bicycle detection function of the present invention.

The bicycle detection algorithm may be applied during the daytime because the bicycle headlight can be detected with the existing parameters (to be verified), and because little or no vertical edges may be detected during the night time (the detected vertical edges are mainly because of the wheels). Because the bicycle speed is typically low compared to the vehicle speed, the bicycle detection algorithm may be triggered only when the host vehicle speed goes below some threshold speed (such as at or below approximately 20 kph or thereabouts, for example). A flow chart of the bicycle detection process is shown in FIG. 15.

Without the vertical edge detection, some situations may result in false detections. For example, speed breakers beside the road (the system may not consider these as stationary objects because they continuously have edges one after the other which may map with the previous ones, so that some frames in this region are detected as targets), bisectors (the shadow of the bisector may create edges at the upper side of the image, in this region small pixel counts results in edge detection and may result in a detection of a target), roadside dark areas with small white patches. With vertical edge detection as an additional feature, the above false detections may be improved.

Also, it is envisioned that a bicycle rider may not always move straight like a vehicle in the lane. If the front wheel swings, then the projected target may not match with the current detected position. In order to account for this, the line error parameter may be adjusted to some extent. Also, it may be difficult to detect a bicycle if there is a shadow on the road and the bicycle is on the shadowed part of the road.

Target Mapping Tolerance:

Optionally, the object detection system and control may provide a near field detection or target mapping tolerance—line error function. Such a detection may utilize use inputs or calibration parameters. For example, a line error image may provide target-mapping tolerances in the image space due to car vibrations (such as about 3 to 6 pixels), or errors in the image processing (e.g. about 1 pixel for an edge filter), or other inputs. Also, a minimum line error (physical) input may provide target mapping tolerances in the physical space due to small variations in the target vehicle speed (this calibration parameter may be in terms of cms). Likewise, a target speed tolerance factor (such as between 0-100) may provide target mapping tolerances in the physical space, as expected to change with the speed of a target. This factor may determine the size of a tolerance band.

During operation of the object detection system, the control may compute the tolerance (the line error pixels) to be used for the target mapping, which may change with the distance from the camera (i.e., the tolerance may be different for the different lines in the image).

The following provides computations/functions that the control may perform to determine the tolerances and the like.

For example, the computation for the $N^{th}$ line:
LineErrorPixels=MAX (LineErrorImage, LineErrorPhysicalInPixels_N).
LineErrorPhysicalInPixels_N=CMtoPIXEL (LineErrorPhysical, N).
CMtoPIXEL (LineErrorPhysical, N) is a function that will convert line error in cm to pixels for a specified line.
LineErrorPhysical=MAX (MinLineErrorPhysical, LineErrorPhysicalWindow).
LineErrorPhysicalWindow= (TargetSpeedToleranceFactor*ExpectedDistanceCoveredByTarget)/100.
Expected DistanceCoveredByTarget=TargetRelativeSpeed*FrameRate.

Day/Night Switch Algorithm:

Optionally, the side object detection system may switch between a daytime sensitivity and a nighttime sensitivity. For example, the algorithm may include the following steps:

1. Compute image histogram (H);
2. compute accumulated image histogram (Ha) using last N (such as, for example, 30) frames;
3. divide Ha into the following four regions:
   (1) dark (0<Gray Level<=Td);
   (2) night (Td<Gray Level<=Tdn);
   (3) day (Tdn<Gray Level<Tb); and
   (4) bright (Tb<=Gray Level<=255),
   using following three thresholds:
   (1) Td (0): dark threshold;
   (2) Tdn (80): day-night threshold (which may be selected in such a way that it separates day (with/without shadow) from the night (with/without headlights); this may be a fixed threshold computed using arithmetic mean or a geometric mean and auto-threshold); and
   (3) Tb (255): bright threshold that is used to separate headlight and overexposed (during day) pixels;
4. count number of pixels into above four regions:
   (1) dark region count (Cd);
   (2) night region count (Cn);

(3) day region count (Cy); and
(4) bright region count (Cb),
and compute:
(1) difference in Cy and Cn in % of total pixels (Ddn)
    [where Ddn=(ABS(Cy−Cn)*100)/ImagePixelCount]; and
(2) extreme peak count (Cd+Cb) in % of total pixels (P)
    [where P=((Cd+Cb)*100)/ImagePixelCount]; and
5. apply the following rules to make a decision:

| Rule No. | Condition(s) | Situation | Decision |
|---|---|---|---|
| 1 | Cn > Cy<br>Ddn >= T1 (sufficient pixels in night region) | Clear Night | Night |
| 2 | Cy > Cn<br>Ddn >= T1 (sufficient pixels in day region) | Clear Day | Day |
| 3 | Cn > Cy<br>Ddn < T1<br>P >= T2 (Extreme peak found) | Night + Headlights | Night |
| 4 | Cn > Cy<br>Ddn < T1<br>P < T2 (No extreme peak found) | Night + Street Light, Day + Clouds, Day + Shadow | No Decision (Previous State) |
| 5 | Cn < Cy<br>Ddn < T1<br>P >= T2 (Extreme peak found) | Day + Overexposure, Day + Snow, Night + Blooming Headlights | No Decision (Previous State) |
| 6 | Cn < Cy<br>Ddn < T1<br>P < T2 (No extreme peak found) | Day + Shadow | Day |

For example, T1=70 percent and T2=2 percent. For rule 4 and 5, additional features may be desired, since the available features may not in all cases be sufficient to differentiate between day and night. If no determination or differentiation is made, the previous state may be retained. The processing time for each frame may be around 1 ms or thereabouts, such as about 0.7 ms.

Headlight Detection:

Optionally, a headlight detection module may be used to improve the nighttime target detection results. Such a module may be integrated with the side object detection algorithm. The headlight detection module or algorithm may use optimized blob analysis code in area of interest, and may identify clusters in an image during nighttime detection mode. The headlight detection module or algorithm may separate out headlights, and saturated and unqualified clusters of lights, and may be able to distinguish between headlights and reflections caused by headlights. The headlight detection module or algorithm may minimize false detections caused because of reflections on the road, or non-headlight light sources. The headlight detection module may detect the position of the headlight, and thus may provide enhanced positional accuracy while target detection. The headlight detection module may also be useful in dusk and dawn condition.

It is envisioned that, by analysis of the saturated clusters, the camera gain and exposure can be controlled in close loop, and thus the day/night switch detection can be improved. It is further envisioned that, for more accuracy, the system may detect both headlights to assist in making the decision of target detection (such as for detecting cars and/or trucks). Also, most or substantially all of the saturated and not qualified clusters may be examined for possible merging of two headlights, such as when the vehicle is far away from the camera on the subject or host vehicle.

Figure 16:
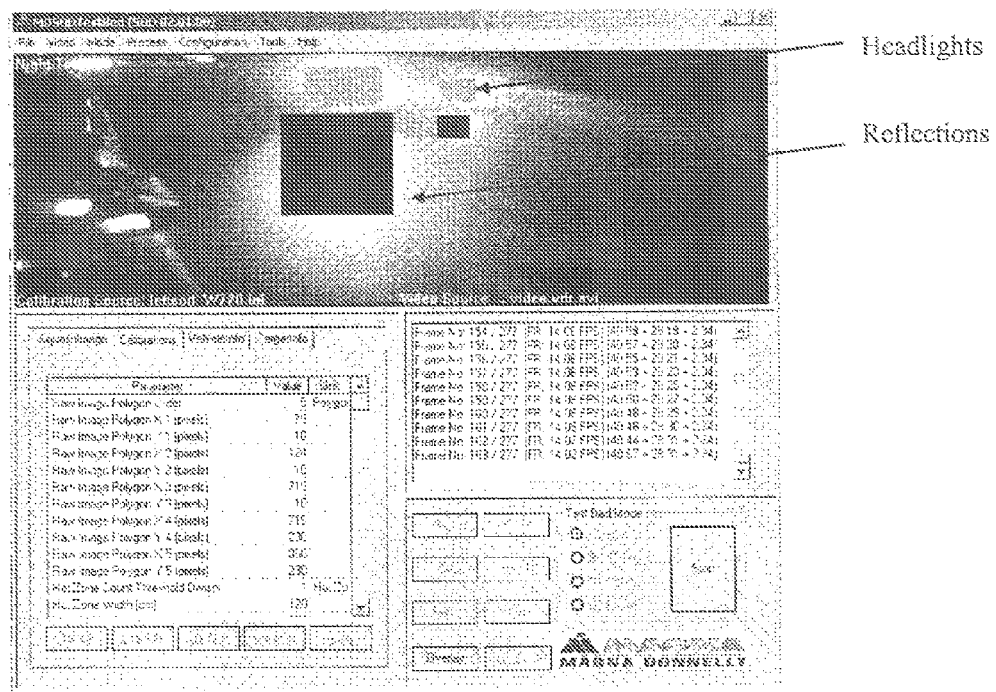
FIGS. 16-20 are representations of captured images of the side area of the subject vehicle, showing the headlight detection function of the present invention.
Figure 17:
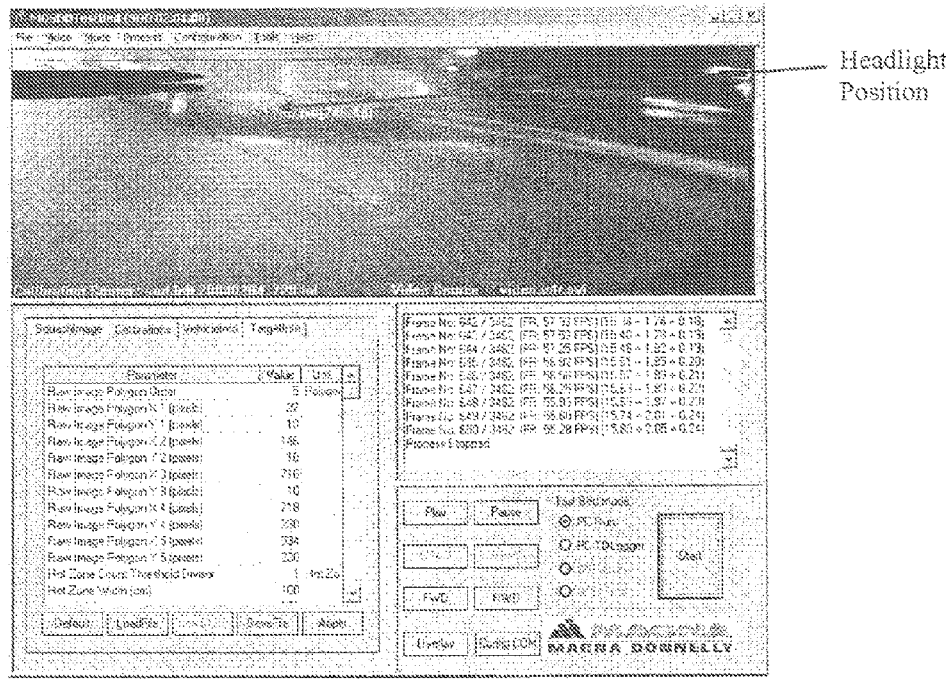
Figure 18:
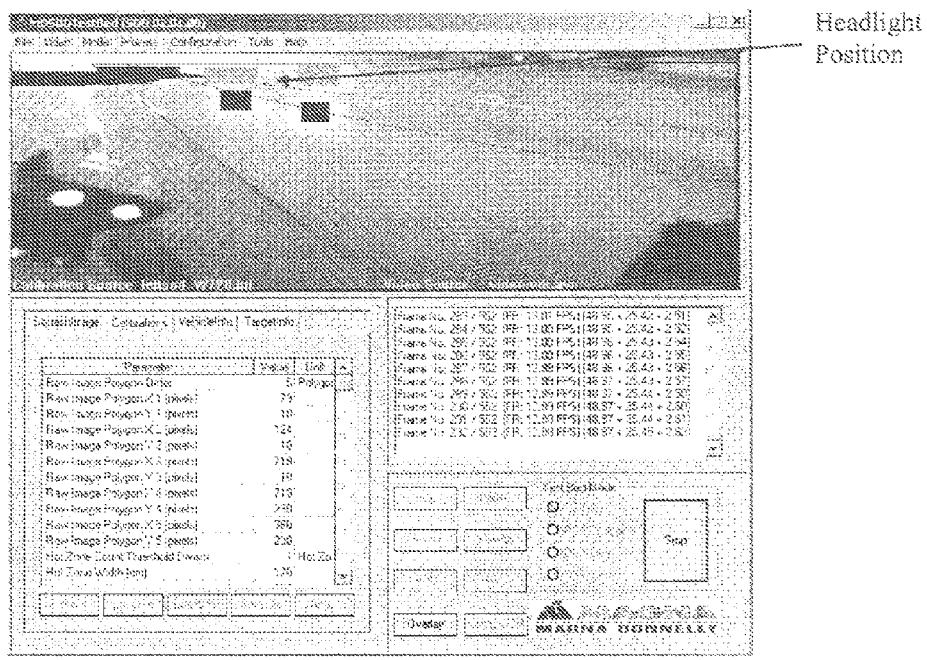
Figure 19:
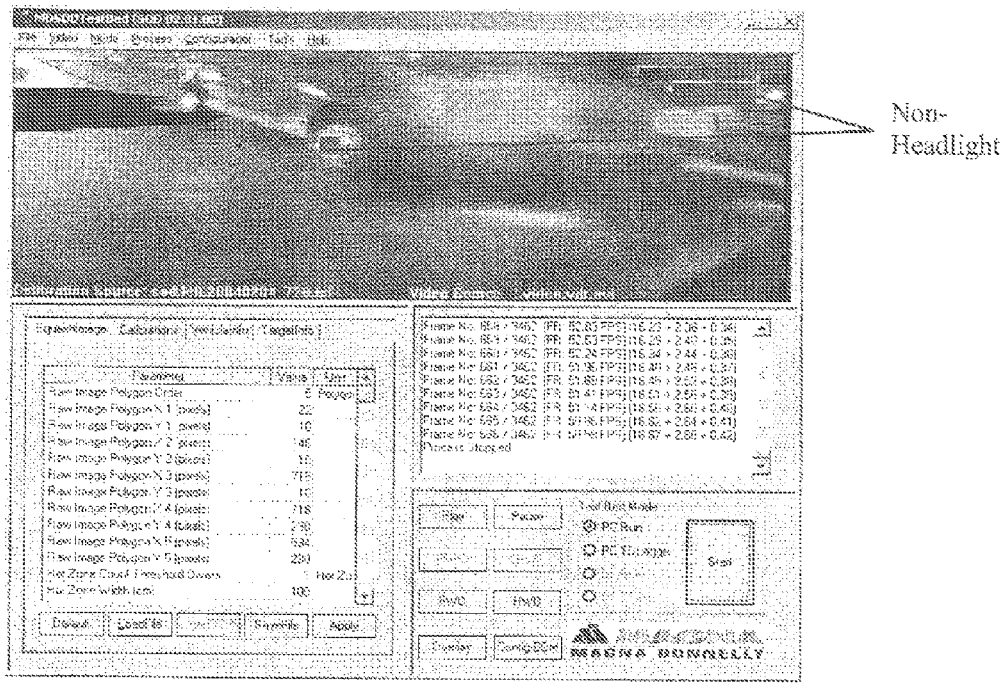
Figure 20:
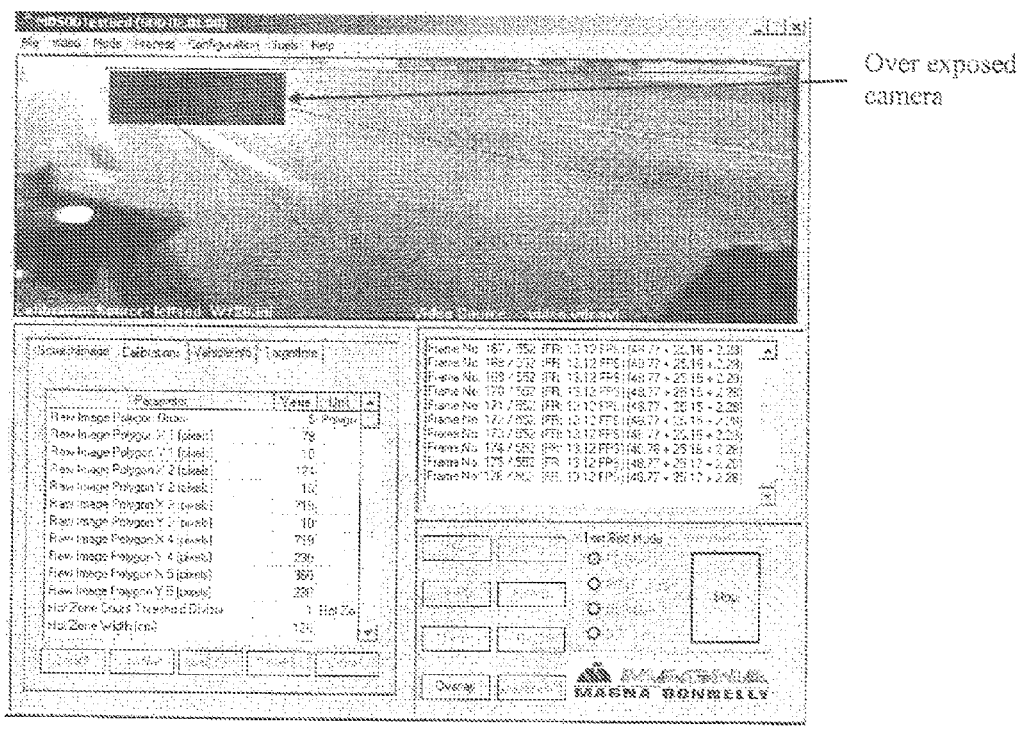

Referring now to FIGS. 16-20, the process of identifying the headlights of a target vehicle is shown. As shown in FIG. 16, the headlights and their reflections are identified, and, as shown in FIGS. 17 and 18, the particular location or position of the headlight/headlights is identified as a target position. The non-headlight sources are identified separately (FIG. 19), and the saturated clusters are identified (FIG. 20), such as may be useful in close loop control of the side object detection system.

The table below indicates the effect on the timing of the detection/identification of side objects, as shown with and without the headlight detection function:

| Modules | With Headlight Detection (mili-second) | Without Headlight Detection (mili-second) |
|---|---|---|
| Process Line | 17.5 | 17.5 |
| Generate Edge image | 3.4 | 3.4 |
| Process Frame | 17.5 | 17.45 |
| Map Targets | 1 | 1 |
| Headlight Detection | 12.9 | — |
| Total | 52.3 | 39.35 |
| Frame Rate | 15 FPS | 15 FPS |

Optionally, the side object detection system and/or the imaging sensor or camera may be associated with other imaging systems or controls, such as imaging systems having an image sensor (such as a video camera, such as a CMOS imaging array sensor, a CCD sensor or the like, such as the types of imaging sensors or cameras disclosed in commonly assigned, U.S. Pat. Nos. 5,550,677; 6,097,023 and 5,796,094, and/or PCT Application No. PCT/US2003/036177, filed Nov. 14, 2003 and published Jun. 3, 2004 as International Publication No. WO 2004/047421, which are hereby incorporated herein by reference), such as a forward facing video image sensor or system, which may include or may be associated with an intelligent rain sensor (such as the types disclosed in commonly assigned U.S. Pat. Nos. 6,320,176; 6,353,392 and 6,313,454, which are hereby incorporated herein by reference), an image or vision system (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, and U.S. patent application Ser. No. 10/422,378, filed Apr. 24, 2003, now U.S. Pat. No. 6,946,978, which are hereby incorporated herein by reference), such as an imaging or object detection system or back up aid of the types described in U.S. Pat. Nos. 6,757,109; 6,717,610; 6,590,719; 6,201,642; 5,929,786 and/or 5,786,772, and/or U.S. patent application Ser. No. 10/427,051, filed Apr. 30, 2003, now U.S. Pat. No. 7,038,577; and/or Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; and/or Ser. No. 60/618,686, filed Oct. 14, 2004, which are hereby incorporated herein by reference, or an intelligent headlamp controller (such as the types described in U.S. Pat. Nos. 5,796,094; 5,715,093 and/or 6,824,281, and/or in U.S. patent application Ser. No. 10/958,087, filed Oct. 4, 2004, now U.S. Pat. No. 7,188,963; and/or Ser. No. 11/105,757, filed Apr. 14, 2005, now U.S. Pat. No. 7,526,103, and/or U.S. provisional applications, Ser. No. 60/607,963, filed Sep. 8, 2004; and Ser. No. 60/562,480, filed Apr. 15, 2004, which are hereby incorporated herein by reference), or an intelligent lane departure warning system (such as the types described in U.S. patent application Ser. No. 10/209,173, filed Jul. 31, 2001, now U.S. Pat. No. 6,882,287; and/or Ser. No. 10/427,051, filed Apr. 30, 2003, now U.S. Pat. No. 7,038,577, which are hereby incorporated herein by reference), and/or the like.

Optionally, the side object detection system of the present invention may include one or more displays, such as a text display, an icon display, a display on demand (DOD) type display (such as may be implemented with a transflective reflective element, such as described in U.S. Pat. Nos. 5,668,663; 5,724,187 and 6,690,268, the entire disclosures of which are hereby incorporated by reference herein), such as a video or touch screen interface display, or a video display screen, such as the types described in PCT Application No. PCT/US03/40611, filed Dec. 19, 2003 and published on Jul. 15, 2004 as International Publication No. WO 2004/058540, and/or U.S. patent application Ser. No. 10/538,724, filed Jun. 13, 2005 and published Mar. 9, 2006 as U.S. Publication No. US-2006-0050018; and Ser. No. Ser. No. 11/284,543, filed Nov. 22, 2005, now U.S. Pat. No. 7,370,983; and/or U.S. provisional applications, Ser. No. 60/630,061, filed Nov. 22, 2004; and Ser. No. 60/667,048, filed Mar. 31, 2005, which are hereby incorporated herein by reference, or the like.

Therefore, the present invention provides a side object detection system that is operable to process captured image data of a scene occurring exteriorly and along one or both sides of the vehicle to determine if a target vehicle or object of interest is located at or in the lane adjacent to the subject or host vehicle. The side object detection system of the present invention may process zones or areas of interest in the captured images and may adjust processing to accommodate any misalignment of the camera that may occur during installation of the camera at the side of the vehicle. The side object detection system may also adjust the processing to adjust the areas of interest, such as in response to a turning of the wheels of the vehicle so that the zone or area is adapted for the turning of the subject vehicle. The side object detection system may detect horizontal edges and vertical edges of objects in the exterior scene and may identify shadows and discern the shadows in the adjacent lane (which may be shadows cast by objects outside of the adjacent lane) from objects or target vehicles that may be present in the adjacent lane. The side object detection system of the present invention may also discern or distinguish between daytime and nighttime conditions and may adjust the image processing accordingly. The side object detection system may also function to detect headlights of a target vehicle in the adjacent lane and to discern or distinguish the headlights of the target vehicle from other light sources, such as reflections or other non-qualified light sources. The side object detection system of the present invention thus provides enhanced image processing and may utilize aspects of the side object detection system described in U.S. patent application Ser. No. 10/209,173, filed Jul. 31, 2001, now U.S. Pat. No. 6,882,287; and/or Ser. No. 10/427,051, filed Apr. 30, 2003, now U.S. Pat. No. 7,038,577, which are hereby incorporated herein by reference.

Changes and modifications in the specifically described embodiments can be carried out without departing from the principles of the present invention, which is intended to be limited only by the scope of the appended claims as interpreted according to the principles of patent law.

What is claimed is:

1. A driver assistance system for a vehicle, said driver assistance system comprising:

a first camera comprising an array of photosensing pixels;

a second camera comprising an array of photosensing pixels;

a rear backup camera comprising an array of photosensing pixels;

wherein said first camera is disposed at a left side of a vehicle equipped with said driver assistance system;

wherein said first camera has a forward field of view in a direction towards the front of the equipped vehicle and has a rearward field of view in a direction towards the rear of the equipped vehicle and has a sideward field of view in a direction away from the left side of the equipped vehicle;

a control for processing image data captured by said first camera, said control comprising an image processor;

wherein said control is operable to determine that said first camera is misaligned when said first camera is disposed at the left side of the equipped vehicle;

wherein said control, responsive to a determination of misalignment of said first camera, is operable to algorithmically at least partially compensate for misalignment of said first camera by at least one of (i) adjusting processing, by said image processor, of captured image data and (ii) adjusting captured image data;

wherein, when said first camera is disposed at the left side of the equipped vehicle, a portion of the left body side of the equipped vehicle is present in the field of view of said first camera;

wherein said second camera is disposed at a right side of the equipped vehicle;

wherein said rear backup camera is disposed at a rear portion of the equipped vehicle generally centrally between where said left side-attached first camera and said right side-attached second camera are disposed at the vehicle;

wherein the field of view of said left side-attached first camera overlaps with the field of view of said rear backup camera and wherein the field of view of said right side-attached second camera overlaps with the field of view of said rear backup camera;

wherein image data captured by said left side-attached first camera, by said right side-attached second camera and by said rear backup camera is processed by said image processor of said control and, at least in part responsive to said processing by said image processor of said control, a composite image is displayed by a display disposed in the interior cabin of the equipped vehicle positioned within the driver's physiological field of view without obstructing the driver's view through the windshield of the equipped vehicle;

wherein said composite image provides a view that approximates a view from a single virtual image capture device;

wherein image data captured at least by said first camera is processed by said image processor using an edge detection algorithm to detect edges of objects exterior of the equipped vehicle, and wherein, responsive at least in part to processing, by said image processor, of captured image data, an object of interest exterior of the equipped vehicle at its left-hand side is determined;

wherein the determined object of interest comprises another vehicle present in a traffic lane to the left of the traffic lane occupied and being traveled in by the equipped vehicle;

wherein processing, by said image processor, using the edge detection algorithm of image data captured at least by said first camera detects vertical edges of the other vehicle; and wherein, via processing, by said image processor, using the edge detection algorithm to detect vertical edges, said driver assistance system distinguishes the detected vertical edges of the other vehicle from shadows and lane markings.

2. The driver assistance system of claim 1, wherein the other vehicle is traveling in the same direction as the equipped vehicle.

3. The driver assistance system of claim 2, wherein at least a portion of the other vehicle is rearward of the rearmost portion of the equipped vehicle.

4. The driver assistance system of claim 3, wherein at least a portion of the other vehicle is forward of the rearmost portion of the equipped vehicle.

5. The driver assistance system of claim 1, wherein processing, by said image processor, using the edge detection algorithm of image data captured at least by said first camera detects vertical edges and filters out shadows and lane markings.

6. The driver assistance system of claim 1, wherein processing, by said image processor, using an edge detection algorithm of image data captured at least by said first camera determines presence in the traffic lane to the left of the traffic lane occupied and being traveled in by the equipped vehicle of at least one of (i) a bicycle and (ii) a bicycle rider.

7. The driver assistance system of claim 1, wherein said first camera disposed at the left side of the equipped vehicle is part of a left-side exterior mirror assembly of the equipped vehicle.

8. The driver assistance system of claim 7, wherein said second camera disposed at the right side of the equipped vehicle is part of a right-side exterior mirror assembly of the equipped vehicle.

9. The driver assistance system of claim 8, wherein image data captured at least by said second camera is processed by said image processor using an edge detection algorithm to detect edges of objects exterior of the equipped vehicle, and wherein, responsive at least in part to processing, by said image processor, of captured image data, an object of interest exterior of the equipped vehicle at its right-hand side is determined.

10. The driver assistance system of claim 9, wherein the determined object of interest comprises another vehicle present in a traffic lane to the right of the traffic lane occupied and being traveled in by the equipped vehicle.

11. The driver assistance system of claim 1, wherein processing of captured image data by said image processor of said control is responsive, at least in part, to an ambient light level at the equipped vehicle.

12. The driver assistance system of claim 11, wherein, in accordance with the ambient light level at the equipped vehicle, said control operates with a daytime sensitivity or a nighttime sensitivity.

13. The driver assistance system of claim 11, wherein said composite image provides a substantially seamless panoramic view.

14. The driver assistance system of claim 1, wherein processing of captured image data by said image processor of said control comprises use of an algorithmically executed filter.

15. The driver assistance system of claim 1, wherein said display comprises a flat panel display and wherein said flat panel display comprises a back-lit liquid crystal display.

16. The driver assistance system of claim 15, wherein said control, responsive to a determination of misalignment of said first camera due to a shift in at least one of yaw, pitch and roll of alignment of said first camera, algorithmically at least partially compensates for the misalignment.

17. A driver assistance system for a vehicle, said driver assistance system comprising:

a first camera comprising an array of photosensing pixels;

a second camera comprising an array of photosensing pixels;

a rear backup camera comprising an array of photosensing pixels;

wherein said first camera is disposed at a left side of a vehicle equipped with said driver assistance system;

wherein said first camera has a forward field of view in a direction towards the front of the equipped vehicle and has a rearward field of view in a direction towards the rear of the equipped vehicle and has a sideward field of view in a direction away from the left side of the equipped vehicle;

a control for processing image data captured by said first camera, said control comprising an image processor;

wherein said control is operable to determine that said first camera is misaligned when said first camera is disposed at the left side of the equipped vehicle;

wherein said control, responsive to a determination of misalignment of said first camera, is operable to algorithmically at least partially compensate for misalignment of said first camera;

wherein, when said first camera is disposed at the left side of the equipped vehicle, a portion of the left body side of the equipped vehicle is present in the field of view of said first camera;

wherein said second camera is disposed at a right side of the equipped vehicle;

wherein said rear backup camera is disposed at a rear portion of the equipped vehicle generally centrally between where said left side-attached first camera and said right side-attached second camera are disposed at the vehicle;

wherein the field of view of said left side-attached first camera overlaps with the field of view of said rear backup camera and wherein the field of view of said right side-attached second camera overlaps with the field of view of said rear backup camera;

wherein image data captured by said left side-attached first camera, by said right side-attached second camera and by said rear backup camera is processed by said image processor of said control and, at least in part responsive to said processing by said image processor of said control, a composite image is displayed by a display disposed in the interior cabin of the equipped vehicle positioned within the driver's physiological field of view without obstructing the driver's view through the windshield of the equipped vehicle;

wherein said composite image provides a view that approximates a view from a single virtual image capture device;

wherein image data captured at least by said first camera is processed by said image processor using an edge detection algorithm to detect edges of objects exterior of the equipped vehicle, and wherein, responsive at least in part to processing, by said image processor, of captured image data, an object of interest exterior of the equipped vehicle is determined;

wherein the determined object of interest comprises another vehicle present in a traffic lane to the left of the traffic lane occupied and being traveled in by the equipped vehicle;

wherein processing, by said image processor, using the edge detection algorithm of image data captured at least by said first camera detects vertical edges of the other vehicle; and wherein, via processing, by said image processor, using the edge detection algorithm to detect vertical edges, said driver assistance system distinguishes the detected vertical edges of the other vehicle from shadows and lane markings; and wherein said control, responsive to a determination of misalignment of said first camera due to a shift in at least one of yaw, pitch and roll of alignment of said first camera, algorithmically at least partially compensates for the misalignment.

18. The driver assistance system of claim 17, wherein said control, responsive to a determination of misalignment of said first camera, is operable to algorithmically at least partially compensate for misalignment of said first camera by adjusting processing, by said image processor, of captured image data.

19. The driver assistance system of claim 17, wherein said control, responsive to a determination of misalignment of said first camera, is operable to algorithmically at least partially compensate for misalignment of said first camera by adjusting captured image data.

20. The driver assistance system of claim 17, wherein processing, by said image processor, using an edge detection algorithm of image data captured at least by said first camera determines presence in a traffic lane to the left of the traffic lane occupied and being traveled in by the equipped vehicle of at least one of (i) a bicycle and (ii) a bicycle rider.

21. The driver assistance system of claim 20, wherein processing, by said image processor, using an edge detection algorithm of image data captured at least by said first camera detects vertical edges of the at least one of (i) a bicycle and (ii) a bicycle rider.

22. The driver assistance system of claim 17, wherein processing, by said image processor, using an edge detection algorithm of image data captured at least by said first camera determines presence of the other vehicle in the traffic lane to the left of the traffic lane occupied and being traveled in by the equipped vehicle.

23. The driver assistance system of claim 22, wherein processing, by said image processor, using an edge detection algorithm of image data captured at least by said first camera detects vertical edges and filters out shadows and lane markings.

24. The driver assistance system of claim 22, wherein said first camera disposed at the left side of the equipped vehicle is part of a left-side exterior mirror assembly of the equipped vehicle and wherein said second camera disposed at the right side of the equipped vehicle is part of a right-side exterior mirror assembly of the equipped vehicle, and wherein image data captured at least by said second camera is processed by said image processor using an edge detection algorithm to detect edges of objects exterior of the equipped vehicle, and wherein, responsive at least in part to processing, by said image processor, of captured image data, an object of interest exterior of the equipped vehicle at its right-hand side is determined, and wherein the determined object of interest comprises another vehicle present in a traffic lane to the right of the traffic lane occupied and being traveled in by the equipped vehicle.

25. The driver assistance system of claim 17, wherein the other vehicle is traveling in the same direction as the equipped vehicle, and wherein at least a portion of the other vehicle is rearward of the rearmost portion of the equipped vehicle, and wherein at least a portion of the other vehicle is forward of the rearmost portion of the equipped vehicle.

26. The driver assistance system of claim 25, wherein processing, by said image processor, using an edge detection algorithm of image data captured at least by said first camera detects vertical edges of the other vehicle.

27. A driver assistance system for a vehicle, said driver assistance system comprising:

a first camera comprising an array of photosensing pixels;

a second camera comprising an array of photosensing pixels;

a rear backup camera comprising an array of photosensing pixels;

wherein said first camera is disposed at a left side of a vehicle equipped with said driver assistance system;

wherein said first camera has a forward field of view in a direction towards the front of the equipped vehicle and has a rearward field of view in a direction towards the rear of the equipped vehicle and has a sideward field of view in a direction away from the left side of the equipped vehicle;

a control for processing image data captured by said first camera, said control comprising an image processor;

wherein said control is operable to determine that said first camera is misaligned when said first camera is disposed at the left side of the equipped vehicle;

wherein said control, responsive to a determination of misalignment of said first camera, is operable to algorithmically at least partially compensate for misalignment of said first camera;

wherein, when said first camera is disposed at the left side of the equipped vehicle, a portion of the left body side of the equipped vehicle is present in the field of view of said first camera;

wherein said second camera is disposed at a right side of the equipped vehicle;

wherein said rear backup camera is disposed at a rear portion of the equipped vehicle generally centrally between where said left side-attached first camera and said right side-attached second camera are disposed at the vehicle;

wherein the field of view of said left side-attached first camera overlaps with the field of view of said rear backup camera and wherein the field of view of said right side-attached second camera overlaps with the field of view of said rear backup camera;

wherein image data captured by said left side-attached first camera, by said right side-attached second camera and by said rear backup camera is processed by said image processor of said control and, at least in part responsive to said processing by said image processor of said control, a composite image is displayed by a display disposed in the interior cabin of the equipped vehicle positioned within the driver's physiological field of view without obstructing the driver's view through the windshield of the equipped vehicle;

wherein said display comprises a flat panel display and wherein said flat panel display comprises a back-lit liquid crystal display;

wherein said composite image provides a substantially seamless view;

wherein said composite image provides a view that approximates a view from a single virtual image capture device;

wherein image data captured at least by said first camera is processed by said image processor using an edge detection algorithm to detect edges of objects exterior of the equipped vehicle, and wherein, responsive at least in part to processing, by said image processor, of captured image data, an object of interest exterior of the equipped vehicle is determined;

wherein the determined object of interest is present in a traffic lane to the left of the traffic lane occupied and being traveled in by the equipped vehicle;

wherein the determined object of interest comprises of at least one of (i) a bicycle and (ii) a bicycle rider;

wherein processing, by said image processor, using the edge detection algorithm of image data captured at least by said first camera detects vertical edges of the at least one of (i) a bicycle and (ii) a bicycle rider; and wherein, via processing, by said image processor, using the edge detection algorithm to detect vertical edges, said driver assistance system distinguishes the detected vertical edges of the at least one of (i) a bicycle and (ii) a bicycle rider from shadows and lane markings; and wherein said control, responsive to a determination of misalignment of said first camera due to a shift in at least one of yaw, pitch and roll of alignment of said first camera, algorithmically at least partially compensates for the misalignment.

28. The driver assistance system of claim 27, wherein processing, by said image processor, using an edge detection algorithm of image data captured at least by said first camera detects vertical edges and filters out shadows and lane markings.

29. The driver assistance system of claim 28, wherein said first camera disposed at the left side of the equipped vehicle is part of a left-side exterior mirror assembly of the equipped vehicle and wherein said second camera disposed at the right side of the equipped vehicle is part of a right-side exterior mirror assembly of the equipped vehicle, and wherein image data captured at least by said second camera is processed by said image processor using an edge detection algorithm to detect edges of objects exterior of the equipped vehicle, and wherein, responsive at least in part to processing, by said image processor, of captured image data, an object of interest exterior of the equipped vehicle at its right-hand side is determined, and wherein the determined object of interest comprises another vehicle present in a traffic lane to the right of the traffic lane occupied and being traveled in by the equipped vehicle.

30. The driver assistance system of claim 29, wherein processing of captured image data by said image processor of said control is responsive, at least in part, to an ambient light level at the equipped vehicle.

31. The driver assistance system of claim 30, wherein, in accordance with the ambient light level at the equipped vehicle, said control operates with a daytime sensitivity or a nighttime sensitivity.

32. The driver assistance system of claim 27, wherein processing of captured image data by said image processor of said control comprises use of an algorithmically executed filter.

33. The driver assistance system of claim 27, wherein said control, responsive to a determination of misalignment of said first camera, is operable to algorithmically at least partially compensate for misalignment of said first camera by adjusting processing, by said image processor, of captured image data.

34. The driver assistance system of claim 27, wherein said control, responsive to a determination of misalignment of said first camera, is operable to algorithmically at least partially compensate for misalignment of said first camera by adjusting captured image data.

* * * * *